(12) United States Patent
Xue et al.

(10) Patent No.: US 8,320,325 B2
(45) Date of Patent: Nov. 27, 2012

(54) METHOD AND APPARATUS FOR MAPPING AND DETECTING CONTROL CHANNEL

(75) Inventors: Lixia Xue, Beijing (CN); Bingyu Qu, Rolling Meadows, IL (US); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/325,641

(22) Filed: Dec. 14, 2011

(65) Prior Publication Data

US 2012/0082130 A1    Apr. 5, 2012

Related U.S. Application Data

(63) Continuation of application No. PCT/CN2010/073936, filed on Jun. 13, 2010.

(30) Foreign Application Priority Data

Jun. 16, 2009  (CN) .......................... 2009 1 0107882
Aug. 13, 2009  (CN) .......................... 2009 1 0165300

(51) Int. Cl.
*H04W 4/00*    (2009.01)

(52) U.S. Cl. ........................................ 370/330; 370/470

(58) Field of Classification Search .................. None
See application file for complete search history.

(56) References Cited

U.S. PATENT DOCUMENTS

| 7,054,315 | B2 * | 5/2006 | Liao | 370/392 |
| 7,733,827 | B2 * | 6/2010 | Kim et al. | 370/328 |
| 7,778,148 | B2 * | 8/2010 | Lee et al. | 370/204 |
| 7,852,806 | B2 * | 12/2010 | Ahn et al. | 370/329 |
| 7,873,004 | B2 * | 1/2011 | Lee et al. | 370/329 |
| 7,920,516 | B2 * | 4/2011 | Nishio et al. | 370/328 |
| 7,929,636 | B2 * | 4/2011 | Kotecha | 375/285 |
| 7,983,145 | B2 * | 7/2011 | Frenger | 370/208 |
| 8,027,297 | B2 * | 9/2011 | Kim et al. | 370/329 |
| 8,077,670 | B2 * | 12/2011 | Fan et al. | 370/330 |
| 8,094,639 | B2 * | 1/2012 | Kim et al. | 370/342 |
| 8,107,966 | B2 * | 1/2012 | Choi et al. | 455/450 |

(Continued)

FOREIGN PATENT DOCUMENTS

CN     1738473     2/2006

(Continued)

OTHER PUBLICATIONS

Written Opinion of International Searching Authority, International application No. PCT/CN2010/073921 issued Sep. 13, 2010.

(Continued)

*Primary Examiner* — Bunjob Jaroenchonwanit

(57) ABSTRACT

A method and apparatus for mapping and detecting control channel are provided. The method for mapping a control channel includes: for the same aggregation level, according to a signaling length of a control channel corresponding to a component carrier, determining a corresponding search space for at least two control channels that have the same signaling length, so as to enable the at least two control channels that have the same signaling length to use the same search space, and mapping the at least two control channels that have the same signaling length to the determined corresponding search space. Therefore, conflicts between the control channels are reduced, and the number of times of blind detection of the control channels is also reduced.

20 Claims, 5 Drawing Sheets

U.S. PATENT DOCUMENTS

| | | | |
|---|---|---|---|
| 8,195,186 B2 * | 6/2012 | Mitra et al. | 455/452.2 |
| 2009/0088148 A1 * | 4/2009 | Chung et al. | 455/423 |
| 2009/0154607 A1 * | 6/2009 | Lindoff et al. | 375/341 |
| 2009/0238091 A1 * | 9/2009 | Kim et al. | 370/252 |
| 2010/0034092 A1 * | 2/2010 | Krishnamurthy et al. | 370/241 |
| 2010/0215011 A1 * | 8/2010 | Pan et al. | 370/329 |
| 2010/0254329 A1 * | 10/2010 | Pan et al. | 370/329 |
| 2010/0281323 A1 * | 11/2010 | Wang et al. | 714/748 |
| 2011/0070845 A1 * | 3/2011 | Chen et al. | 455/91 |
| 2011/0103509 A1 * | 5/2011 | Chen et al. | 375/295 |
| 2011/0110316 A1 * | 5/2011 | Chen et al. | 370/329 |
| 2011/0128882 A1 * | 6/2011 | Shimizu et al. | 370/252 |
| 2011/0222629 A1 | 9/2011 | Lindh et al. | |
| 2011/0243056 A1 * | 10/2011 | Jen | 370/312 |
| 2011/0249578 A1 * | 10/2011 | Nayeb Nazar et al. | 370/252 |
| 2011/0292887 A1 * | 12/2011 | Baldemair et al. | 370/329 |
| 2011/0292891 A1 * | 12/2011 | Hsieh et al. | 370/329 |
| 2012/0021756 A1 * | 1/2012 | Kwon et al. | 455/450 |

FOREIGN PATENT DOCUMENTS

| | | |
|---|---|---|
| CN | 101242625 A | 8/2008 |
| CN | 101252783 | 8/2008 |
| CN | 101448332 | 6/2009 |
| CN | 101646244 | 2/2010 |
| CN | 101729455 | 6/2010 |
| WO | WO 2008/157692 A2 | 12/2008 |
| WO | WO2009/041779 A1 | 4/2009 |
| WO | WO 2010/145532 A1 | 12/2010 |
| WO | WO 2010/145540 A1 | 12/2010 |

OTHER PUBLICATIONS

International Search Report issued in related International application No. PCT/CN2010/073921 dated Sep. 2010.

International Search Report issued in PCT/CN2010/073936 dated Sep. 23, 2010.

Written Opinion of International Searching Authority issued in International application No. PCT/CN2010/073936 issued Sep. 13, 2010.

3GPP, "3rd Generation Partnership Project;Technical Specification Group Radio Access Network; Evolved Universal Terrestrial Radio Access (E-UTRA); Physical layer procedures (Release 10)" http://www.3gpp.org, © 2011, 3GPP Organizational Partners, dated Sep. 2011.

Source: CMCC, Title: Resource Allocation and PDCCH Design Issues in Carrier Aggregation 3GPP TSG-RAN WG1 #55bis, R1-090337, Ljubljana, Slovenia, Jan. 12-Jan. 16, 2009.

Source: Huawei, Title: LTE—A PDCCH blind decoding3GPP TSG RAN WG1 meeting #60, R1—101048, San Francisco, USA, dated Feb. 22-26, 2010.

European Search Report of corresponding European Patent Application No. 10788928.9, mailed Apr. 12, 2012, 8 pages total.

Catt, 3GPP Draft R1-090938 Agenda 12.1 Discussion and Decision, "DL Control Channel Scheme for LTE-A," 3rd Generation Partnership Project (3GPP) TSG RAN WG1 #56, Athens, Greece, Feb. 9-13, 2008, 4 pages total.

Huawei, 3GPP Draft R1-090815 Agenda 12.1 Discussion, "PDCCH Design for Carrier Aggregation", 3rd Generation Partnership Project (3GPP) TSG RAN WG1 #56, Athens, Greece, Feb. 9-13, 2008, 5 pages total.

Samsung, 3GPP Draft R1-081212 Agenda 6.1.3 Discussion/Decision, "UE-Specific Search Space," 3rd Generation Partnership Project (3GPP) TSG RAN WG1 #52bis, Shenzhen, China, Mar. 31-Apr. 4, 2008, 7 pages total.

Samsung, 3GPP Draft R1-081217 Agenda 6.1.3 Discussion/Decision "Compact UL-SCH Assignment in E-UTRA", 3rd Generation Partnership Project (3GPP) TSG RAN WG1 #52bis, Shenzhen, China, Mar. 31-Apr. 4, 2008, 4 pages total.

European Search Report of corresponding European Patent Application No. 10788926.3, mailed Apr. 12, 2012, 7 pages total.

First Office Action of corresponding Chinese Patent Application No. 200910107882.0, mailed Mar. 23, 2012, and English translation thereof, 9 pages total.

First Office Action of corresponding U.S. Appl. No. 13/298,080, mailed Jan. 17, 2012, 18 pages total.

First page of issued corresponding Chinese patent CN101998526, citations listed in item 56, patent issued on Aug. 29, 2012, one page only.

* cited by examiner

METHOD AND APPARATUS FOR MAPPING AND DETECTING CONTROL CHANNEL

CROSS-REFERENCE TO RELATED APPLICATIONS

This application is a continuation of International Application No. PCT/CN2010/073936, filed on Jun. 13, 2010, which claims priority to Chinese Patent Application No. 200910107882.0, filed on Jun. 16, 2009 and Chinese Patent Application No. 200910165300.4, filed on Aug. 13, 2009, all of which are hereby incorporated by reference in their entireties.

FIELD OF THE INVENTION

The present disclosure relates to the field of communication technologies, and in particular, to a method for mapping a control channel, a method for detecting a control channel and devices thereof.

BACKGROUND OF THE INVENTION

In a 3rd Generation Partnership Project (3GPP) evolved universal terrestrial radio access (E-UTRA) communication system, during transmission of a physical data channel for a user equipment (UE), the UE needs to be notified through scheduling assignment instructions of the system. The scheduling assignment instructions are usually borne by a physical downlink control channel (PDCCH), and the scheduling assignment instruction is, for example, a downlink scheduling grant (DL_grant) corresponding to a physical downlink shared channel (PDSCH) and an uplink scheduling grant (UL_grant) corresponding to a physical uplink shared channel (PUSCH).

In a long-term evolution (LTE) frequency division duplex (FDD) system, data transmission can only be performed on a pair of uplink and downlink component carriers at a UE side and a network side, the PDCCH includes two types of scheduling indication signaling: DL_grant and UL_grant, specifically used for indicating scheduling of the downlink or uplink physical data channel resource corresponding to the UE on the component carrier pair. However, after the carrier aggregation technology is introduced into the LTE-Advanced system, at the UE side and the network side, data can be transmitted on a plurality of component carriers or component carrier pairs at the same time, and the scheduling signaling of the data channel corresponding to each component carrier is independently encoded, so that the resource scheduling signaling on each component carrier needs a PDCCH.

In a carrier aggregation system, a PDCCH corresponding to a UE may be transmitted on each component carrier, so as to schedule transmission of a PDSCH of the UE on the component carrier or a PUSCH corresponding to the component carrier. Alternatively, the PDCCH of the UE may be transmitted on one or more component carriers. At this time, the PDCCH can not only indicate transmission of a data channel on a downlink component carrier on which the PDCCH is and a corresponding uplink component carrier, but also may further indicate transmission of a data channel on a downlink component carrier different from that of the PDCCH or a component carrier that is not correspondingly uplink paired.

For a UE, when PDCCHs corresponding to multiple component carriers are transmitted on a component carrier or a few component carriers, as a search space corresponding to a control channel has a limited size, the probability of collisions between the control channels is high, which may result in that a part of the PDCCHs of the UE cannot be scheduled, so that a part of the data of the UE cannot be transmitted, and the throughput of the UE is reduced.

SUMMARY OF THE INVENTION

Embodiments of the present disclosure provide a method for mapping a control channel, a method for detecting a control channel and devices thereof, so as to reduce the probability of collisions between the control channels.

An embodiment of the present disclosure provides a method for mapping a control channel, where the method includes:

for the same aggregation level, according to a signaling length of a control channel corresponding to a component carrier, determining a corresponding search space for at least two control channels that have the same signaling length, so as to enable the at least two control channels that have the same signaling length to use the same search space, and mapping the at least two control channels that have the same signaling length to the determined corresponding search space; and for the same aggregation level, according to a signaling length of a control channel corresponding to a component carrier, determining corresponding search spaces for at least two control channels that have different signaling lengths respectively, so as to enable the at least two control channels that have different signaling lengths to use the different search spaces in at least one time transmission unit, and respectively mapping the at least two control channels that have different signaling lengths to the determined corresponding search spaces.

An embodiment of the present disclosure provides a method for detecting a control channel, where the method includes:

for the same aggregation level, according to a signaling length of a control channel corresponding to a component carrier, determining a corresponding search space for at least two control channels that have the same signaling length, so as to enable the at least two control channels that have the same signaling length to use the same search space, and detecting, in the determined same search space, the control channels that have the signaling lengths included in the same search space; and for the same aggregation level, according to a signaling length of a control channel corresponding to a component carrier, determining corresponding search spaces for at least two control channels that have different signaling lengths respectively, so as to enable the at least two control channels that have different signaling lengths to use the different search spaces in at least one time transmission unit, and respectively detecting, in the determined different search spaces, the control channels that have the signaling lengths included in the different search spaces.

An embodiment of the present disclosure further provides a transmitting equipment, including:

a first processing module and a second processing module, in which the first processing module includes: a first search space determination module, configured to, for the same aggregation level, according to a signaling length of a control channel corresponding to a component carrier, determine a corresponding search space for at least two control channels that have the same signaling length, so as to enable the at least two control channels that have the same signaling length to use the same search space; and a first mapping module, configured to map the at least two control channels that have the same signaling length to the corresponding search space determined by the first search space determination module; and the second processing module includes: a second search space determination module, configured to, for the same aggregation level, according to a signaling length of a control channel corresponding to a component carrier, determine corresponding search spaces for at least two control channels that have different signaling lengths respectively, so as to enable the at least two control channels that have different signaling lengths to use the different search spaces in at least one time transmission unit; and a second mapping module, configured to respectively map the at least two control channels that have different signaling lengths to the corresponding search spaces determined by the second search space determination module.

An embodiment of the present disclosure further provides a receiving equipment, including:

a first processing module and a second processing module, in which the first processing module includes: a first search space determination module, configured to, for the same aggregation level, according to a signaling length of a control channel corresponding to a component carrier, determine a corresponding search space for at least two control channels that have the same signaling length, so as to enable the at least two control channels that have the same signaling length to use the same search space; and a first detection module, configured to detect, in the same search space determined by the first search space determination module, the control channels that have the signaling lengths included in the same search space; and the second processing module includes: a second search space determination module, configured to, for the same aggregation level, according to a signaling length of a control channel corresponding to a component carrier, determine corresponding search spaces for at least two control channels that have different signaling lengths respectively, so as to enable the at least two control channels that have different signaling lengths to use the different search spaces in at least one time transmission unit; and a second detection module, configured to respectively detect, in the different search spaces determined by the second search space determination module, the control channels that have the signaling lengths included in the different search spaces.

As can be seen from the description of the foregoing technical solutions, in all the embodiments of the present disclosure, search spaces are flexibly configured, so that for the same aggregation level, corresponding search spaces are determined for at least two control channels that have different signaling lengths respectively, and the determined search spaces are different in at least one time transmission unit; as a result, the at least two control channels that have different signaling lengths correspond to the different search spaces, the probability of collisions between the at least two control channels that have different signaling lengths is reduced, and effective scheduling and transmission of the control channels of a UE are ensured, thereby achieving successful data transmission of the UE and increasing the throughput of the UE. Optimally, on the other hand, through the embodiments of the present disclosure, the at least two control channels that have the same signaling length are enabled to use the same search space, so that the flexibility of transmission of the control channels that have the same signaling length and are corresponding to different component carriers is increased, and the probability of collisions between the at least two control channels that have the same signaling length is reduced.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Figure 1:
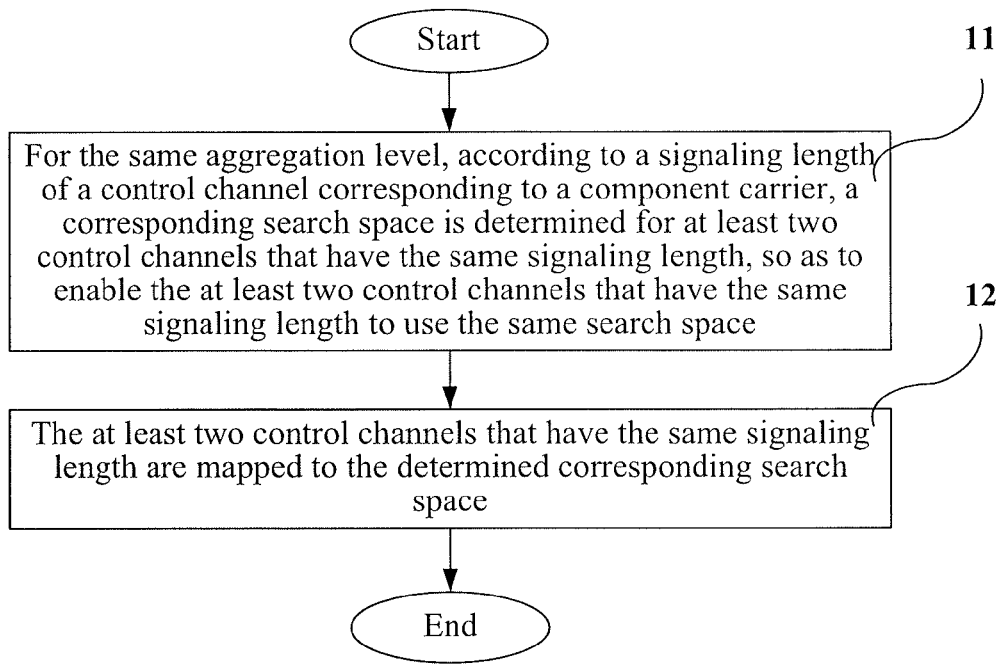
FIG. 1 is a schematic flow chart of a method for mapping a control channel according to Embodiment 1 of the present disclosure.

In order to make the objectives, technical solutions, and advantages of the present disclosure more comprehensible, the present disclosure is described in further detail below with reference to embodiments and the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

A 3GPP E-UTRA system is also referred to as an LTE system. In the LTE system, bandwidths variable from 1.4 M (6 RB) to 20 M (100 RB) are supported, in which the RB is short for a resource block. For any system bandwidth, in each time transmission unit, for example, a subframe, a physical layer PDCCH occupies a certain resource in both time domain and frequency domain, and a time frequency resource that the system allocates to the PDCCH is also variable. For example, the PDCCH occupies all usable subcarrier resources on the frequency domain. However, on the time domain, the system flexibly configures a time domain resource occupied by the PDCCH by adopting a control format indicator (CFI) value in a physical control format indicator channel (PCFICH), that is, adopting the number of orthogonal frequency division multiplexing (OFDM) symbols. In the system, 2 bits are adopted to represent three different cases of the number of the OFDM symbols, for example, three cases in which the number of the OFDM symbols is 1, 2, 3 when the system bandwidth is greater than 10 RB, or three cases in which the number of the OFDM symbols is 2, 3, 4 when the system bandwidth is smaller than or equal to 10 RB. The time frequency resource (the subcarrier resource, the number of the OFDM symbols) allocated to the PDCCH is divided into multiple control channel elements (CCEs), and the CCE is a minimum unit of forming a PDCCH time frequency resource. The time frequency resource occupied by a PDCCH has 4 aggregation levels, which respectively correspond to 1, 2, 4, and 8 CCEs being occupied, and according to the channel quality condition of the UE, the system selects a suitable aggregation level (corresponding to a different encoding rate) to transmit the PDCCH of the UE.

In the LTE system, the physical layer PDCCHs of all UEs are shared in each time transmission unit. The UE performs blind detection in a certain search space for a possibility of any transmission format of the PDCCH through a specific scrambling code of its own, so as to detect all possible control channel information lengths, an aggregation level and position of an occupied time frequency resource CCE. In order to reduce the number of times of blind detection performed by the UE in a control channel region, a transmission mode adopted by the UE in a period of time is defined, and a search space is planed. A possible transmission mode adopted by the UE in a period of time is notified to the UE in a semistatic manner through dedicated signaling. The LTE system has 7 downlink transmission modes, each transmission mode correspondingly requires detection of two PDCCH formats, and the specific PDCCH format of the UE is determined in the search space through blind detection. The search space is a time frequency resource on a piece of logic defined according to the CCE, and the UE receives control channels and performs blind detection in this space. The search space includes a public search space and a UE specific search space, where the public search space refers to a search space in which all the UEs that are in a connected state and require detection of the PDCCH need blind detection, and the UE specific search space means that only this UE requires PDCCH blind detection in this specific search space. In the UE specific search space, a certain number of CCEs form a search space, which includes 4 aggregation levels. It is specified in the protocol that space sizes respectively corresponding to 4 aggregation levels in total of 1, 2, 4, and 8 CCEs are respectively 6, 6, 2, and 2. Unless the public search space is particularly mentioned, the embodiments of the present disclosure are mainly directed to the method for mapping and the method for detecting control channels in the UE specific search space.

When a system schedules a UE to transmit or receive data, the PDCCH used for scheduling indication may be mapped and transmitted at a certain CCE aggregation level in the UE specific search space or the public search space. At the same time, the UE needs to perform reception and blind detection in the possible specific search space or public search space of PDCCH mapping and transmission. If the detected signaling data of the UE passes the cyclical redundancy check (CRC), it indicates that the detected PDCCH is sent to the UE by the system. The UE analyzes the PDCCH according to the signaling format defined in the specification, so as to determine a time frequency resource position of channels through which the UE needs to receive or transmit data. Subsequently, the UE completes the data reception and transmission, to realize communication between the UE and the system.

In an LTE-Advanced system, the carrier aggregation technology is used for support wider bandwidth, so as to satisfy the requirement of a peak data rate in the fourth generation communication technology of the International Telecommunication Union (ITU). In the carrier aggregation, spectrums of two or more component carriers are aggregated to obtain an LTE-Advanced system having a wider transmission bandwidth. Each component carrier may be configured to be compatible with the LTE system, and the spectrums of all the component carriers may be adjacent consecutive spectrums, non-adjacent spectrums in the same band, or even nonconsecutive spectrums in different bands. The LTE UE can only be connected to one pair of compatible component carriers for data reception and transmission, and the LTE-Advanced UE can be connected to multiple component carriers for data reception and transmission at the same time according to the capability and service demands. The carrier aggregation technology is also referred to as the spectrum aggregation technology, or the bandwidth extension technology.

In the LTE-Advanced system, two or more component carriers are scheduled to one UE at the same time for transmitting uplink or downlink services of the UE at the same time. In the carrier aggregation technology, each component carrier has an independent hybrid automatic repeat request (HARQ) process, and the system may configure the same number or different numbers of component carriers for the LTE-Advanced UE, to transmit data channels or control channels. The PDCCH of the UE can be transmitted on each component carrier, for scheduling a downlink service channel PDSCH of the component carrier or a corresponding uplink service channel PUSCH of the component carrier, and at this time, the control channel PDCCH and the data channel scheduled by the control channel PDCCH may be on the same component carrier. In addition, all the PDCCHs of the UE may also be transmitted on one or more component carriers, for scheduling the PDSCH or PUSCH transmitted on all scheduled uplink or downlink component carriers of the UE, and at this time, the control channel and the data channel scheduled by the control channel may not be on the same component carrier, which is called separation of the control channel from the data channel scheduled by the control channel.

In a heterogeneous network system, a carrier interference coordination mechanism is adopted between component carriers of different systems, or a transmission performance of a control channel is enhanced and a carrier having small interference is selected for bearing the control channel, or control signaling coverage among different systems is coordinated, to avoid frequent switching processes of the UE between multiple component carriers in the same cell. For example, in a home service system (Home NodeB), as a small number of UEs are supported, a few control channels are needed, and even one symbol control channel resource in one component carrier can satisfy the demand. Other component carriers may be used for data transmission, so as to increase the data rate, and at the same time, also coordinate with a macro cell to select a component carrier having small interference to bear a control channel. In a coordinated multipoint (CoMP) transmission/reception system, two or more cells or access points are used for transmitting data on different component carriers for the same UE, but the control channel may be transmitted on merely a part of component carriers of the service cell. When the LTE-Advanced UE has the demand of an uplink service higher than that of a downlink service, the number of the downlink component carriers configured for the UE may be smaller than that of the uplink component carriers, definitely there is a downlink component carrier transmitting multiple PDCCHs to schedule corresponding multiple uplink PUSCH channels, thereby preventing the UE from receiving data on unnecessary downlink component carriers. When the aggregated component carriers have unequal bandwidths, especially, when a part of the component carrier bandwidths are small, sometimes, the PDCCHs for scheduling data on the component carrier are limited, while the remaining resource of the data channel still exists, and the PDCCH for scheduling transmission of the small bandwidth carrier data can be transmitted on other carriers.

The embodiments of the present disclosure are illustrated by taking the LTE-Advanced system as an example, but the present disclosure is not limited to the LTE-Advanced system, and the present disclosure is also applicable to other systems, such as a wideband code division multiple access (WCDMA) system, or an LTE system.

As shown in FIG. 1, which is a schematic flow chart of a method for mapping a control channel according to Embodiment 1 of the present disclosure. The method includes the following steps.

In step 11, for the same aggregation level, according to a signaling length of a control channel corresponding to a component carrier, a corresponding search space is determined for at least two control channels that have the same signaling length, so as to enable the at least two control channels that have the same signaling length to use the same search space.

In step 12, the at least two control channels that have the same signaling length are mapped to the determined corresponding search space.

A transmitting equipment maps the control channels to the search space determined according to the signaling lengths, and the transmitting equipment is, for example, a network equipment, such as a base station at the network side.

In this embodiment, after step 12, the method may further include the step of transmitting the control channels mapped to the search space.

The enabling the at least two control channels that have the same signaling length to use the same search space includes: enabling the at least two control channels that have the same signaling length and are corresponding to different component carriers to use the same search space; or enabling the at least two control channels that have the same signaling length and are corresponding to the same component carrier to use the same search space.

Steps 11 and 12 are about the method in the case that the at least two control channels that have the same signaling length exist in one or more component carriers, and when at least two control channels that have different signaling lengths exist in one or more component carriers, steps 11 and 12 may also be the following steps or performed together with the following steps.

For the same aggregation level, according to a signaling length of a control channel corresponding to a component carrier, corresponding search spaces are determined for at least two control channels that have different signaling lengths respectively, so as to enable the at least two control channels that have different signaling lengths to use the different search spaces in at least one time transmission unit.

The at least two control channels that have different signaling lengths are respectively mapped to the corresponding search spaces determined.

The determining the corresponding search spaces for the at least two control channels that have different signaling lengths respectively, so as to enable the at least two control channels that have different signaling lengths to use the different search spaces in the at least one time transmission unit includes: determining corresponding search spaces respectively for at least two control channels that have different signaling lengths and are corresponding to different component carriers, so as to enable the at least two control channels that have different signaling lengths to use the different search spaces in at least one time transmission unit; or determining corresponding search spaces respectively for at least two control channels that have different signaling lengths and are corresponding to the same component carrier, so as to enable the at least two control channels that have different signaling lengths to use the different search spaces in at least one time transmission unit.

In practical applications, mapping rules of the corresponding search spaces of the control channels corresponding to the component carriers need to be specified before the receiving and transmitting ends send the control channels to each other, including: which control channels that have the same signaling length and are corresponding to which carriers use the same search space, and/or search spaces need to be respectively determined for which control channels that have different signaling lengths and are corresponding to which carriers. In addition, before the mapping rules of the corresponding search spaces of the control channels corresponding to the component carriers are specified, in order to realize transmission and detection of the control channels at the receiving and transmitting ends, an initial or a default mapping rule, and a position and a size of a search space corresponding to a certain or some control channels corresponding to the component carriers may also be included. The method for determining the mapping rules of the corresponding search spaces of the control channels corresponding to the component carriers may be specified in the standard protocol, explicitly obtained by the receiving and transmitting sides through algorithms in the standard protocol, or notified to the receiving equipment by the transmitting end through dedicated signaling, including high layer semistatic signaling, physical layer dynamic signaling, and a media access layer control channel.

During the determination of the corresponding search spaces for the at least two control channels that have different signaling lengths respectively, the corresponding search spaces for the two control channels that have different signaling lengths are respectively determined, that is, the search spaces are independent and have no dependence relationships or rules. The corresponding search spaces for the two control channels that have different signaling lengths may be respectively determined according to different signaling length identifiers (IDs) corresponding to the two different signaling lengths, or respectively determined according to component carrier IDs corresponding to the two control channels that have different signaling lengths, or determined by any one or a combination of the foregoing correlative quantities, and the present disclosure does not limit the selection of the specific ID parameters. For example, the component carrier A has three corresponding signaling lengths a, b, and c, and the component carrier B has four corresponding signaling lengths a, b, d, and e. The control channels that have the signaling length a are enabled to use the same search space, search spaces corresponding to control channels that have the signaling lengths c and d are respectively determined, and the determination of the search spaces corresponding to the control channels that have the two signaling lengths c and d is independent. For example, the search spaces are respectively determined according to different signaling length IDs corresponding to the signaling lengths c and d, or respectively determined according to a carrier ID corresponding to the component carrier A having the signaling length c and a carrier ID corresponding to the component carrier B having the signaling length d, or determined by a combination of the above two correlative quantities, and the present disclosure does not limit the selection of the specific ID parameters. The determination result is that, the search spaces corresponding to the control channels that have the two different signaling lengths may be the same or different, which depends on the randomization of the parameter for determining the search spaces acting on the method for determining the search spaces, or is determined by other independent determination methods. In addition, the present disclosure may not limit the search spaces corresponding to the control channels that have the other signaling length b and are corresponding to the component carrier A and that have the other signaling lengths b and e and are corresponding to the component carrier B.

Preferably, if the control channels that have the same signaling length use the same search space, the UE performs blind detection once in the search space to confirm whether the search space corresponds to a certain control channel among all the control channels that have the same signaling length, thereby reducing the number of times of blind detection and decreasing the detection complexity. In addition, the size of the search space, that is, the number of included CCEs, is set relatively flexibly, and the search space is reduced as much as possible as long as the probability of conflicts between the control channels is satisfied, so as to further decrease the number of times of blind detection. For example, the component carrier A has three corresponding signaling lengths a, b, and c, the component carrier B has four corresponding signaling length formats a, b, d, and e, and the component carrier C has two corresponding signaling lengths a and f, so the control channels that have the signaling length a and are corresponding to the component carrier A, the control channels that have the signaling length a and are corresponding to the component carrier B, and the control channels that have the signaling length a and are corresponding to the component carrier C are enabled to use the same search space, and meanwhile the control channels that have the signaling length b and are corresponding to the component carrier A and the control channels that have the signaling length b and are corresponding to the component carrier B are also enabled to use the same search space.

Preferably, corresponding search spaces are respectively determined for control channels that have different signaling lengths, so that the search spaces corresponding to the control channels that have the different signaling lengths may be different, thereby reducing the probability of collisions between the control channels that have the different signaling lengths, which ensures that the control channels of the UE can be effectively scheduled and transmitted, so as to achieve successful data transmission of the UE and increase the throughput of the UE. Compared with the case that the control channels that have the different signaling lengths also have the same search space, the method of determining the search space corresponding to the control channel that has each signaling length independently enables the control channel that has each signaling length to obtain its own corresponding search space, and when the search spaces are not overlapped and the sizes are the same as those in the contrast schemes, the probability of collisions between the control channels is reduced, and at the same time the number of times of blind detection is not increased, as only the control channels that have the corresponding signaling length need to be detected in the search space and are corresponding to the control channel that has each signaling length. For example, the component carrier A has two corresponding signaling lengths a and c, the component carrier B has two corresponding signaling length formats a and b, and the component carrier C has one corresponding signaling length d, so the search spaces corresponding to the control channels that have the signaling length c and are corresponding to the component carrier A, the search spaces corresponding to the control channels that have the signaling length b and are corresponding to the component carrier B, and the search spaces corresponding to the control channels that have the signaling length d and are corresponding to the component carrier C are respectively determined.

Preferably, the method of determining the search space corresponding to the control channel may further include the following step. The control channels that have the same signaling length and are corresponding to one component carrier use the same search space, or the search spaces corresponding to the control channels that have the different signaling lengths and are corresponding to one component carrier are respectively determined. In the case that the control channels that have the same signaling length and are corresponding to one component carrier use the same search space, the UE performs blind detection once in the same search space to confirm that whether the search space corresponds to a certain control channel among all the control channels that have the same signaling length, so as to reduce the number of times of blind detection and decrease the detection complexity. In addition, compared with the case that the control channels that have the different signaling lengths and are corresponding to one component carrier also have the same search space, in the embodiments of the present disclosure, the method for determining the search space corresponding to the control channel that has each signaling length independently enables each signaling length to have its own corresponding search space, and when the search spaces are not overlapped and the sizes are the same as those in the contrast schemes, the probability of collisions between the control channels is reduced, and at the same time the number of times of blind detection is not increased, as only the control channels that have the corresponding signaling lengths need to be detected in the search space determined by the UE. For example, the component carrier A has two corresponding signaling lengths a and b, so the search spaces corresponding to the control channels that have the signaling lengths a and b and are corresponding to the component carrier A are respectively and independently determined, and the determination results may be the same or different, which depends on the randomization of the parameter for determining the search spaces acting on the method for determining the search spaces.

In specific implementation, for the control channels that have the same signaling length and are corresponding to one component carrier, for example, Format 0 and Format 1A having the same signaling length, the two formats may respectively include 1-bit information, for explicitly indicating whether the control channel is in Format 0 or Format 1A. If the control channels that have the same signaling length are from different component carriers, the carrier indication information in the control channel can be multiplexed to differentiate which carrier is indicated, so that the detected control channel may correspond to component carriers scheduled by the control channel, the carrier indication information may be represented by a dominant bit or differentiated by adopting a scrambling code, and the specific method is not limited in the present disclosure. The method of adding bit indication can still be adopted for differentiating the specific formats of the control channels that have the same signaling length and are corresponding to one component carrier.

Furthermore, the method of determining the corresponding search space for the at least two control channels that have the same signaling length or the method of determining the corresponding search spaces for the at least two control channels that have different signaling lengths may respectively include the following examples.

In a first example, a start position and a size of the search space corresponding to the control channel are determined.

For example, according to a signaling length ID or a signaling length group ID, the start position of the search space corresponding to the control channel is determined; or according to randomly one or more of: a signaling length ID or a signaling length group ID, and a UE ID, a control channel format ID, space division, a component carrier ID corresponding to the control channel, a subframe number or an aggregation level, the start position of the search space corresponding to the control channel is determined. In the embodiments of the present disclosure, the determination of the size of the search space may include the following steps. The size of the search space corresponding to the control channel that has the signaling length is determined according to a signaling notification mode, which may change according to dynamic notification of signaling; or, the size of the search space corresponding to the control channel that has the signaling length is determined according to the number of control channels that have a certain signaling length, which may be determined in a mode defined by a standard protocol, for example, the size of the search space is determined according to the number of the control channels that have the current signaling length; or, the size of the search space corresponding to the control channel that has the signaling length is determined according to a specified algorithm; or, the size of the corresponding search space of the control channel that has the signaling length at the same aggregation level is determined according to sizes of search spaces corresponding to all aggregation levels in the existing LTE system. When one search space is distributed on one component carrier, the start position of the search space may be a start number of the CCE included in the search space, and the size of the search space may be the number of the CCEs included in the search space. When the CCEs included in the search space are consecutive, the search space may be directly determined according to the start position and the size. When the CCEs included in the search space are nonconsecutive, the search space is determined further according to a nonconsecutive rule in addition to the start position and the size. The nonconsecutive rule may be, for example, the CCE numbers are odd numbers, even numbers, numbers at an interval of n or in other regular nonconsecutive forms. When one search space is distributed on multiple component carriers, the start position and size of the search space included on each component carrier are respectively determined, that is, the corresponding start number of the CCE and the number of the CCEs on each component carrier, and then the CCEs are added to obtain the complete search space distributed on the multiple component carriers.

In a second example, according to an initial search space corresponding to the control channel that has the signaling length, the search space corresponding to the control channel that has the signaling length is determined.

In the second example, an initial search space corresponding to the control channel that has the signaling length needs to be determined first, and in one case, the initial search space corresponding to the control channel that has the signaling length may be obtained through the following steps.

The initial search space corresponding to each component carrier is determined, and the initial search space corresponding to the control channel that has each signaling length and is corresponding to the same component carrier is the initial search space of the same component carrier.

At this time, a start position of an initial search space corresponding to each component carrier may be determined according to randomly one or more of: a UE ID, space division, a component carrier ID, a subframe number or an aggregation level. In the embodiments of the present disclosure, the determination of the size of the initial search space may include the following steps. The size of the initial search space corresponding to the component carrier is determined according to a signaling notification mode, which may change according to dynamic notification of signaling; or, the size of the initial search space corresponding to the component carrier is determined according to the number of control channels corresponding to the component carrier, which may be determined in a mode defined by a standard protocol, for example, the size of the initial search space is determined according to the number of the control channels corresponding to the current component carrier; or, the size of the initial search space corresponding to the component carrier is determined according to a specified algorithm; or, the corresponding size of the initial search space of the control channel that has the signaling length at the same aggregation level is determined according to the sizes of search spaces corresponding to all aggregation levels in the existing LTE system. For example, the initial search space corresponding to the component carrier is configured according to parameters such as the number of control channels corresponding to the component carrier and/or the aggregation level, or determined according to an algorithm specified in a standard protocol. Typically, for each aggregation level, the initial search space corresponding to the control channel that has the signaling length and is corresponding to each component carrier is the same as the search space in the existing LTE system. Definitely, compared with the search space in the LTE system, an initial search space of a control channel that has a signaling length and is corresponding to a specific component carrier, for example, a main carrier, may also be larger, and initial search spaces corresponding to carriers other than the main carrier are smaller than the search space of the LTE system; other possible configurations may also be applicable, which depends on the demands of the system, and the present disclosure is not limited in this aspect.

In another case, the initial search space corresponding to the control channel that has the signaling length may be obtained through the following steps.

In step 1, the initial search space corresponding to the control channel that has each signaling length and is corresponding to each component carrier is determined.

In step 2, if at least two same signaling lengths exist in the signaling lengths corresponding to the same component carrier, the control channels that have the at least two same signaling lengths are enabled to use the same initial search space; and/or, if at least two different signaling lengths exist in the signaling lengths corresponding to the same component carrier, the control channels that have the at least two different signaling lengths are enabled to use different initial search spaces in at least one time transmission unit.

At this time, according to a signaling length ID or a signaling length group ID, a start position of an initial search space corresponding to a control channel that has each signaling length and is corresponding to each component carrier is determined; or according to randomly one or more of: a signaling length ID or a signaling length group ID, and a UE ID, a control channel format ID, space division, a component carrier ID corresponding to the control channel, a subframe number or an aggregation level, a start position of an initial search space corresponding to a control channel that has each signaling length and is corresponding to each component carrier can be determined. In the embodiments of the present disclosure, the determination of the size of the initial search space may include the following steps. The size of the initial search space corresponding to the control channel that has the signaling length is determined according to a signaling notification mode, which may change according to dynamic notification of signaling; or, the size of the initial search space corresponding to the control channel that has the signaling length is determined according to the number of control channels that have a certain signaling length in a mode defined in a standard protocol, for example, the size of the initial search space is determined according to the number of the control channels that have the current signaling length; or, the size of the initial search space corresponding to the control channel that has the signaling length is determined according to a specified algorithm; or, the size of the corresponding initial search space of the control channel that has the signaling length at the same aggregation level is determined according to sizes of search spaces corresponding to all aggregation levels in the existing LTE system.

In still another case, furthermore, if a large number of component carriers are scheduled by the UE, or as single user multiple-input multiple-output (SU-MIMO), multi-antenna transmission, consecutive and nonconsecutive resource allocation are supported, the UE may support control channels that have various signaling lengths in each subframe. At this time, during determination of a search space corresponding to a control channel according to signaling lengths of control channels corresponding to component carriers, the component carriers may further be grouped, and after the component carriers are grouped, the initial search space corresponding to the control channel that has the signaling length may be further obtained through the following steps.

An initial search space corresponding to each component carrier group is determined, and the initial search space corresponding to the control channel that has each signaling length and is corresponding to the same component carrier group is the initial search space of the same component carrier group.

At this time, a start position of an initial search space corresponding to each component carrier group may be determined according to randomly one or more of: a UE ID, space division, a component carrier group ID, a subframe number or an aggregation level.

The method for grouping the component carriers may include the following steps. Each pair of uplink and downlink component carriers are divided into a group; or component carriers having the same transmission mode are divided into a group; or component carriers having the same transmission bandwidth are divided into a group; or component carriers having the same number of transmit antennas are divided into a group; or a random combination of the above methods can be used. The present disclosure does not limit the specific grouping method.

In a second example, after the initial search space corresponding to the control channel that has the signaling length is determined, the specific method for determining the search space corresponding to the control channel that has the signaling length according to the initial search space includes the following steps.

If one signaling length of a control channel corresponding to one component carrier is different from one signaling length of a control channel corresponding to another one or more component carriers, the search space corresponding to the control channel that has one signaling length and is corresponding to the one component carrier and the another one or more component carriers is completely or partially the same as the initial search space corresponding to the control channel that has the one signaling length. The search space corresponding to the control channel that has the one signaling length and the initial search space corresponding to the control channel that has the one signaling length being partially the same means that: The search space corresponding to the control channel that has the one signaling length is a certain subset of the initial search space corresponding to the control channel that has the signaling length, or the CCEs are increased or reduced according to the subset; and/or If one signaling length of the control channel corresponding to one component carrier is the same as one signaling length of the control channel corresponding to another one or more component carriers, the search space corresponding to the control channel that has one signaling length and is corresponding to the one component carrier and the another one or more component carriers is all or a part of a search space formed by the initial search space corresponding to the control channel that has the one signaling length and is corresponding to the one component carrier and the initial search space corresponding to the control channel that has the one signaling length and is corresponding to the another one or more component carriers. The search space corresponding to the control channel that has the one signaling length being a part of the search space formed by the initial search spaces corresponding to the control channels that have the signaling lengths means that: The search space corresponding to the control channel that has the one signaling length is a certain subset of all the initial search spaces corresponding to the control channels that have the signaling length, or the CCEs are increased or reduced according to the subset.

The method for specifying the search space corresponding to the control channel that has the signaling length according to the initial search space corresponding to the control channel that has the signaling length after grouping can be acquired in a similar manner.

In this embodiment, for the same aggregation level, a transmitting equipment may determine a search space corresponding to a control channel according to a signaling length of the control channel, which facilitates the design of the search space, reduces the number of times of blind detection, and alleviates the conflicts between the control channels, thereby reducing the probability of collisions between the control channels.

The specific analysis is as follows. For example, when control channels corresponding to any one or more component carriers include the same signaling length, the control channels that have the same signaling length may use the same search space, and when the UE performs blind detection on the search spaces included at an aggregation level, that is, the CCE resource, it can be determined whether a certain control channel has the signaling length through detection once. At this time, the control channels that have the signaling length may flexibly use the search space of the control channels that have the same signaling length, and the control channels can be flexibly mapped to the space without increasing the number of times of blind detection, but the limits of transmission of the control channels are reduced, thereby correspondingly reducing the probability of collisions between the control channels. When the signaling lengths of two control channels are the same, the following cases are included. The two control channels have the same format corresponding to the same component carrier. Alternatively, the two control channels have different formats corresponding to the same component carrier, for example, the same component carrier has different formats: Format 0 and Format 1A, but has the same signaling length. Alternatively, the two control channels have the same format corresponding to different component carriers having the same bandwidth. Alternatively, the two control channels have different formats corresponding to different component carriers having the same bandwidth. Alternatively, the two control channels have the same format corresponding to different component carriers having the same number of antennas. Alternatively, the two control channels have different formats corresponding to different component carriers having the same number of antennas. Or, even some additional processing is performed on the two control channels, for example, a padding bit is added, or an indication bit of some information is reduced (such as increasing the granularity of resource allocation), to reduce a bit number used for resource allocation, thereby enabling the two control channels that have the same format or different formats to have the same signaling length. The signaling length of the control channel is a major factor that influences the number of times of blind detection, and the reason is that, the receiving equipment needs to perform blind detection on corresponding various signaling lengths that may occur in the search space at a possible aggregation level in the search space, and when the control channels that have the same signaling length use the same search space, the UE performs blind detection in the search space once to determine whether the search space corresponds to a certain control channel among all the control channels that have the same signaling length, thereby reducing the number of times of blind detection and decreasing the detection complexity.

When signaling lengths of control channels corresponding to any one or more component carriers are different, search spaces corresponding to the control channels that have different signaling lengths are respectively determined, and at this time, the search spaces corresponding to the control channels that have the different signaling lengths may be different. When the search spaces are not overlapped and have the same sizes as those of the control channels that have the different signaling lengths, the control channels that have the corresponding signaling length only need to be detected in the search space corresponding to the control channel that has each signaling length, thereby reducing the probability of collisions between the control channels without increasing the number of times of blind detection. Therefore, the probability of collisions between the control channels that have different signaling lengths is reduced, and it is ensured that the control channels of the UE can be effectively scheduled and transmitted, thereby achieving successful data transmission of the UE and increasing the throughput of the UE without adding the number of times of blind detection.

Figure 2A:
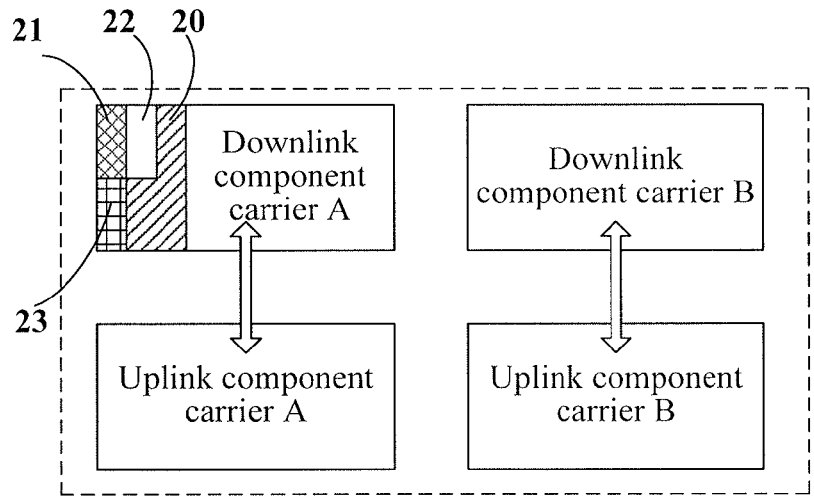
FIG. 2a is a schematic view of a method for mapping a control channel according to Embodiment 2 of the present disclosure.
Figure 2B:
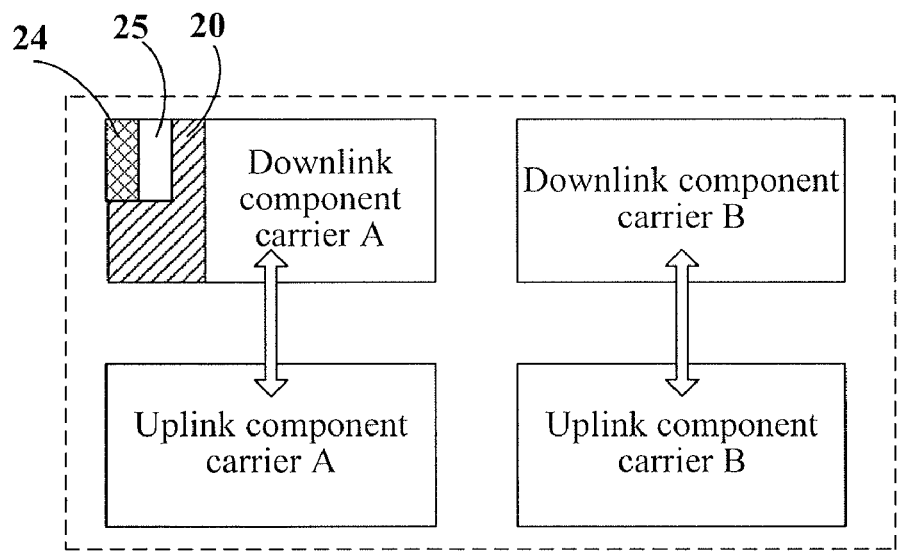
FIG. 2b is another schematic view of the method for mapping a control channel according to Embodiment 2 of the present disclosure.

FIG. 2a is a schematic view of a method for mapping a control channel according to Embodiment 2 of the present disclosure, and FIG. 2b is another schematic view of the method for mapping a control channel according to Embodiment 2 of the present disclosure. As shown in FIG. 2a, search spaces corresponding to control channels that have various signaling lengths and are corresponding to one component carrier are mapped onto one component carrier, and as shown in FIG. 2b, search spaces corresponding to control channels that have various signaling lengths and are corresponding to multiple component carriers are mapped onto one component carrier. On the basis of the method for mapping a control channel according to Embodiment 1 of the present disclosure, the control channel may be, for example, a PDCCH, and the PDCCH is taken as an example for illustration in this embodiment and the following embodiments, but the present disclosure is not limited to the PDCCH.

In this embodiment, one component carrier may correspond to N signaling lengths of the PDCCH, and the PDCCHs having the N signaling lengths perform data transmission on one or more component carriers corresponding to the UE.

As shown in FIG. 2a, when a transmitting equipment determines to enable one UE to correspond to control channels that have N signaling lengths on one component carrier, for the same aggregation level, at least two control channels that have the same signaling length and are corresponding to the same component carrier are enabled to use the same search space; and/or, corresponding search spaces are determined respectively for at least two control channels that have different signaling lengths and are corresponding to the same component carrier, so as to enable the at least two control channels that have different signaling lengths to use the different search spaces in at least one time transmission unit. For example, search spaces of PDCCHs that have N signaling lengths and are corresponding to one component carrier are independently determined respectively. For a UE3, it is assumed that the UE3 corresponds to three signaling lengths of the PDCCH on one component carrier: N=3, corresponding to data transmission of one component carrier pair A (uplink and downlink component carriers A). The transmitting equipment may allocate one search space to a PDCCH that has each signaling length and is corresponding to data transmission of one component carrier pair A within a control channel region 20 on the downlink component carrier A, and three search spaces in total are allocated: a search space 21, a search space 22, and a search space 23, in which PDCCHs having one signaling length can be merely borne within each search space.

As shown in FIG. 2b, when the transmitting equipment determines that control channels that have various signaling lengths and are corresponding to multiple component carriers of one UE are mapped onto one component carrier, for the same aggregation level, a corresponding search space is determined for at least two control channels that have the same signaling length and are corresponding to different component carriers, so as to enable the at least two control channels that have the same signaling length to use the same search space; and/or, corresponding search spaces are respectively determined for at least two control channels that have different signaling lengths and are corresponding to different component carriers, so as to enable the at least two control channels that have different signaling lengths to use the different search spaces in at least one time transmission unit. For example, the transmitting equipment configures that the service data of the UE3 can be borne on the component carrier pairs A and B for transmission, and the transmitting equipment configures that all control channels PDCCHs of the UE3 are transmitted on the downlink component carrier A, that is to say, the scheduling of the PDCCHs corresponding to the data of the UE3 on both the downlink component carrier A and the downlink component carrier B is borne by the downlink component carrier A. For each PDCCH aggregation level, the transmitting equipment may allocate a search space to a control channel that has each signaling length within the control channel region 20 on the downlink carrier A. It is assumed that N=2, two signaling lengths X and Y of the PDCCH exist on one downlink component carrier A, and one signaling length X of the PDCCH exists on the downlink component carrier B, so the downlink component carrier A and the downlink component carrier B have the same signaling length X. In FIG. 2b, one search space 24 is allocated to PDCCHs having the same signaling length X on the two carriers, and another search space 25 is allocated to a PDCCH having another signaling length Y different from X on the downlink component carrier A. In conclusion, search spaces, including, for example, the search space 24 and the search space 25, can be allocated to PDCCHs that have signaling lengths and are corresponding to multiple component carriers. The CCE numbers included in the two search spaces may be completely different, or partially the same, or even completely the same, and these differences influence the probability of PDCCH collisions of the UE and the PDCCH formats or signaling lengths to be detected in the corresponding search space of the UE. For example, reference can be made to related examples of the method for mapping a control channel according to Embodiment 1 of the present disclosure.

Figure 3:
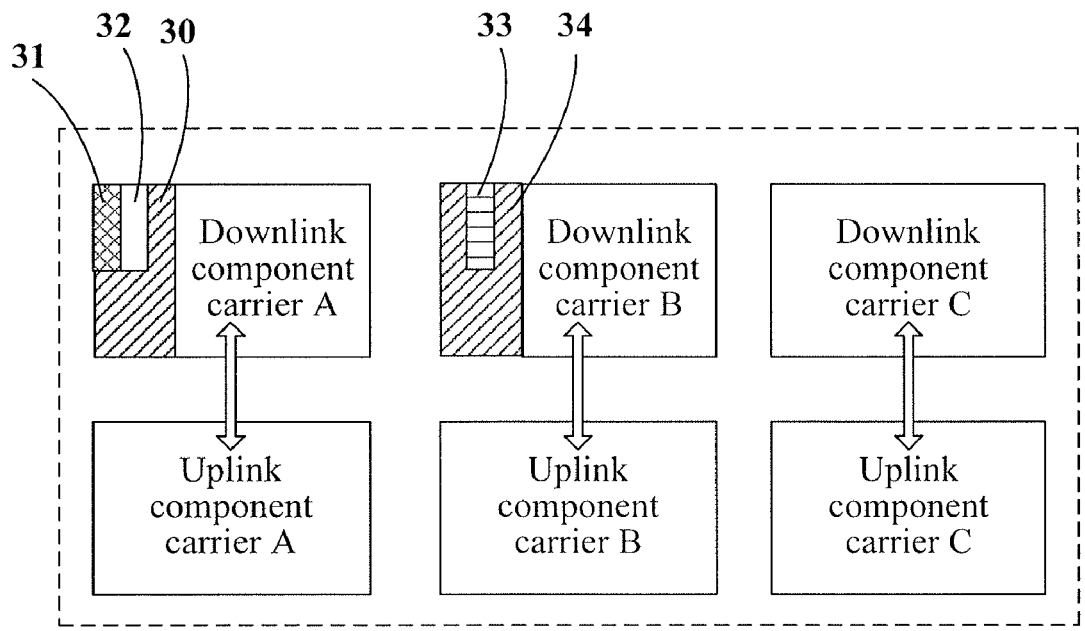
FIG. 3 is another schematic view of the method for mapping a control channel according to Embodiment 2 of the present disclosure.

Extensionally, FIG. 3 is another schematic view of the method for mapping a control channel according to Embodiment 2 of the present disclosure. As shown in FIG. 3, when the transmitting equipment determines to enable one UE to correspond to N signaling lengths of the PDCCH on P component carriers, in one case, N search spaces are allocated to the UE based on each aggregation level within all control channel regions of the P component carriers, so that the PDCCH having each signaling length is borne within its corresponding search space. In another case, when N signaling lengths of the PDCCH are borne on the P component carriers for one UE, M (M<N) search spaces can be allocated to the UE based on each aggregation level within all control channel regions of the P component carriers, and at this time the at least two control channels that have different signaling length correspond to one same search space. In FIG. 3, P=2, N=3, the transmitting equipment configures that service data of a UE4 can be borne on paired uplink and downlink component carriers A, B, and C for transmission, the transmitting equipment also configures that the control channel PDCCH of the UE4 can be transmitted on the downlink component carrier A and the downlink component carrier B, and it is assumed that the scheduled signaling lengths of the PDCCH of the UE4 include signaling lengths X, Y, and Z. For each PDCCH aggregation level, the transmitting equipment may allocate three search spaces in total on the downlink component carrier A and the downlink component carrier B, and each search space only bears a control channel that has a signaling length of the PDCCH, and the number of CCEs included in each search space may be reconfigured by the transmitting equipment as requires. Two search spaces, that is, a search space 31 and a search space 32 corresponding to the signaling lengths X and Y of the PDCCH may be configured in a control channel region 30 of the downlink component carrier A, and a search space 33 having the signaling length Z of the PDCCH may be configured in a control channel region 34 of the downlink component carrier B. The CCE numbers included in the search spaces 31 and 32 may be the same or completely different. In addition to this method, the search space having the signaling length Z of the PDCCH may also correspond to the search space 31 in the control channel region 30 of the downlink component carrier A, so that the search space having the signaling length Z of the PDCCH can be distributed on multiple component carriers, and the foregoing example not only includes the search space 31 in the control channel region 30 of the downlink component carrier A, but also includes the search space 33 in the control channel region 34 of the downlink component carrier B. In conclusion, all CCEs of one search space may be distributed on one component carrier, and may also be distributed on multiple component carriers.

In view of the above, for an aggregation level, search spaces corresponding to control channels that have various signaling lengths may be distributed on one component carrier or distributed on multiple component carriers, and the CCE numbers in the search spaces may be consecutive or nonconsecutive. When the search spaces corresponding to the control channels that have the signaling lengths of the PDCCH are distributed within one component carrier, start CCE numbers and all included CCE numbers of the search spaces on the component carrier are obtained, so as to obtain the search spaces corresponding to the control channels that have the signaling lengths of the PDCCH. When the search spaces corresponding to the PDCCHs having the signaling lengths of the PDCCH are distributed in multiple component carriers, the CCE numbers included in the search spaces corresponding to each component carrier are obtained, and the CCEs are added to obtain the search spaces corresponding to the PDCCHs having the signaling lengths of the PDCCH. If the CCE numbers in the corresponding search spaces on one component carrier are consecutive, according to the start CCE number of the determined search space and the number of the CCEs included in the search space, all the CCE numbers included in the search space can be acquired.

In this embodiment, the determining the search space corresponding to the PDCCH having a certain signaling length may include the following examples.

In a first example, a start position and a size of a search space corresponding to a PDCCH having a certain signaling length are determined.

The start position of the search space corresponding to the control channel is determined according to a signaling length ID or a signaling length group ID; or the start position of the search space corresponding to the control channel is determined according to randomly one or more of: a signaling length ID or a signaling length group ID, and a UE ID, a control channel format ID, space division, a component carrier ID corresponding to the control channel, a subframe number or an aggregation level. The signaling length ID and the signaling length group ID may be a system specific signaling length ID, that is, an absolute signaling length ID, or a UE specific signaling length ID, that is, a relative signaling length ID; and the component carrier ID corresponding to the control channel may also be a system specific component carrier ID, that is, an absolute component carrier ID, or a UE specific component carrier ID, that is, a relative component carrier ID.

The start position of the search space, that is, the CCE number at the start position, can be determined, for example, through calculation according to the UE ID. As the same UE may correspond to different UE IDs on different component carriers, the start position of the search space can be calculated using the UE ID, so that the start positions of search spaces of different component carriers on the same aggregation level are different. A start position of a search space corresponding to a control channel in a subframe k of one UE is calculated using a UE ID, for example, calculated through the following formulas (1) and (2):

$$Y_k = (A \times Y_{k-1}) \bmod D \qquad (1)$$

$$Z_k = L \times [Y_k \bmod \lfloor N_{cce,k} \div L \rfloor] \qquad (2).$$

In the above formulas (1) and (2), A may be, for example, 39827; D may be, for example, 65537; an iterative value $Y_k$ may be regarded as an iterative value that changes with a subframe number k, and when k=0, $Y_{-1}$ is an iterative initial value, in which the iterative initial value is generally a UE ID allocated to the UE by the system or referred to as a cell radio network temporary identifier (C-RNTI) equal to $n_{RNTI}$ and the iterative initial value is not 0; L is an aggregation level; $N_{CCE,k}$ is the total number of CCEs for controlling channel transmission of the system in the $k^{th}$ subframe; the iterative value $Y_k$ of the current subframe is obtained by taking the modulus of a product of an iterative value $Y_{k-1}$ of a previous subframe multiplied by a constant A with respect to D, so that the iterative value $Y_k$ of the current subframe is a result obtained through an iterative operation with iterative values of the previous (K−1) subframes; mod represents the operation of taking the modulus; and $Z_k$ represents the start position of the search space corresponding to the control channel if the system allocates a control channel at an aggregation level L to a UE with the UE ID $n_{RNTI}$ in the $k^{th}$ subframe.

The transmitting equipment allocates different UE IDs to different UEs, the UE IDs are not only used for identifying different UEs in the same cell, but also have a function of randomizing a start position of a search space during the calculation of the search space of the UE. The randomization method may also randomize distribution of search spaces corresponding to the control channels between the UEs to a certain degree, so as to reduce collisions of the control channels between the UEs.

In addition to the determination of the start CCE number of the search space through calculation by using the UE ID, the number of the CCE at the start position of the search space may also be determined together with the signaling length ID, and for example, the signaling length of the PDCCH supported by the UE in the current subframe can be identified. As different UEs support different numbers of signaling lengths of the PDCCH, the ID adopted for the same signaling length of the PDCCH may also be different, which has a UE specific characteristic and is a relative signaling length ID adopted by the UE. Definitely, all the signaling lengths of the PDCCH supported in the system may also be absolutely identified, in which the signaling length IDs of the PDCCH corresponding to the signaling lengths of the PDCCH of the UE are adopted. The UE specific signaling length ID of the PDCCH is used for differentiating the search spaces corresponding to the PDCCHs having various signaling lengths, and different signaling lengths of the PDCCH corresponding to the same UE have different signaling length IDs of the PDCCH. For example, the start position can be calculated through the following formulas (3) and (4):

$$Y_k = (A \times Y_{k-1} \times M_{k,p}) \bmod D \quad (3)$$

$$Z_k = L \times [Y_k \bmod \lfloor N_{cce,k} \div L \rfloor] \quad (4)$$

In the above formulas (3) and (4), $M_{k,p}$ is a signaling length ID of the PDCCH corresponding to a signaling length of a $p^{th}$ control channel in the subframe k, and the $M_{k,p}$ is not 0; the meanings of other parameters are the same as those in the formulas (1) and (2).

It can be seen from the above two examples that, when a parameter different from the UE ID, for example, a signaling length ID or a component carrier ID, is introduced for calculating the start CCE number of the search space, in theory, it is equivalent to using another UE ID in the current subframe. When the $Y_k$ in a certain subframe is equal to the $Y_k$ corresponding to the another UE ID with the change of time, as the introduced parameter, for example, the signaling length ID or the component carrier ID, cannot change dynamically with the subframe, for instance, the component carrier ID corresponding to the UE changes in a semistatic manner, when the $Y_k$ corresponding to the two users are equal in a certain subframe, the $Y_k$ remain equal in the following subframes, so that collisions keep occurring between the control channels of the two users. In one solution, the allocation of the another UE ID that makes the two parameters equivalent is stopped, which influences the method for allocating the UE ID. In another solution, non-multiplication (for example, an additive relationship) is adopted for the $M_{k,p}$, so that continuous collisions may not occur in random changes of the subframe.

As the number of all the CCEs allocated to the control channel may be involved during the determination of the start position of the search space by using the signaling length ID of the PDCCH, in this embodiment, all the CCEs allocated to the control channel may be divided, that is, divided in space, to further determine the start position of the search space. For example, the number of all the CCEs allocated to the PDCCH is 100, so that when the signaling length ID of the PDCCH is used for calculation, in order to prevent the calculation result from exceeding the 100 CCEs, the calculation result may be limited within the 100 CCEs, for example, by taking a modulus of the calculation result with respect to 100. Therefore, the start positions of the search spaces obtained through calculation of the signaling length IDs of different PDCCHs may be the same. In order to further avoid overlapping search spaces corresponding to control channels that have different signaling lengths of one UE, all the CCEs may be divided into two groups, that is, the whole search space allocated to the PDCCH is divided into two. In this way, it is limited that a part of the search space can only be located in a first space obtained through division, and the other search space can only be located in a second space obtained through division. In order to better avoid collisions between the control channels, the search space can be divided according to the number or classification of the signaling lengths of the PDCCH. For example, if totally N signaling lengths of the PDCCH exist, the whole search space allocated to the control channel is divided into N, so that the search space for each signaling length of the PDCCH can only be located in the corresponding divided space; therefore, the CCEs included in the search spaces corresponding to the PDCCHs having different signaling lengths are not overlapped, and without changing the number of times of blind detection, the PDCCH mapping regions of multiple signaling lengths corresponding to one UE are different, which reduces collisions between the control channels. Definitely, one CCE region may also be allocated to PDCCHs having multiple signaling lengths, so the CCEs included in the search spaces corresponding to the PDCCHs having certain signaling lengths are overlapped. For example, a start position of a search space corresponding to a control channel in a subframe k of one UE can be calculated through the following formulas (5) and (6):

$$Y_k = (A * Y_{k-1}) \bmod D \quad (5)$$

$$Z_k = L \times [Y_k \bmod \lfloor (n \times N_{cce,k}) \div (N \times L) \rfloor] \quad (6)$$

In the above formulas (5) and (6), N is the number of spaces divided from the whole control channel space; n is a signaling length of an nth control channel, and generally $n \leq N$; the meanings of other parameters are the same as the formulas (1) and (2).

The size of the search space means the number of CCEs included in the search space, which may be fixed or variable. The size of the search space corresponding to the control channel that has the signaling length is determined according to a signaling notification mode, which, for example, changes dynamically with signaling; or, the size of the search space corresponding to the control channel that has the signaling length is determined according to the number of control channels in a mode defined in a standard protocol, for example, the size of the search space is determined according to the number of the control channels that have the current signaling length; or, the size of the search space corresponding to the control channel that has the signaling length is determined according to a specified algorithm; or, the size of the search space corresponding to the control channel that has the signaling length at the same aggregation level is determined according to sizes of search spaces corresponding to all aggregation levels in the existing LTE system.

Figure 4:
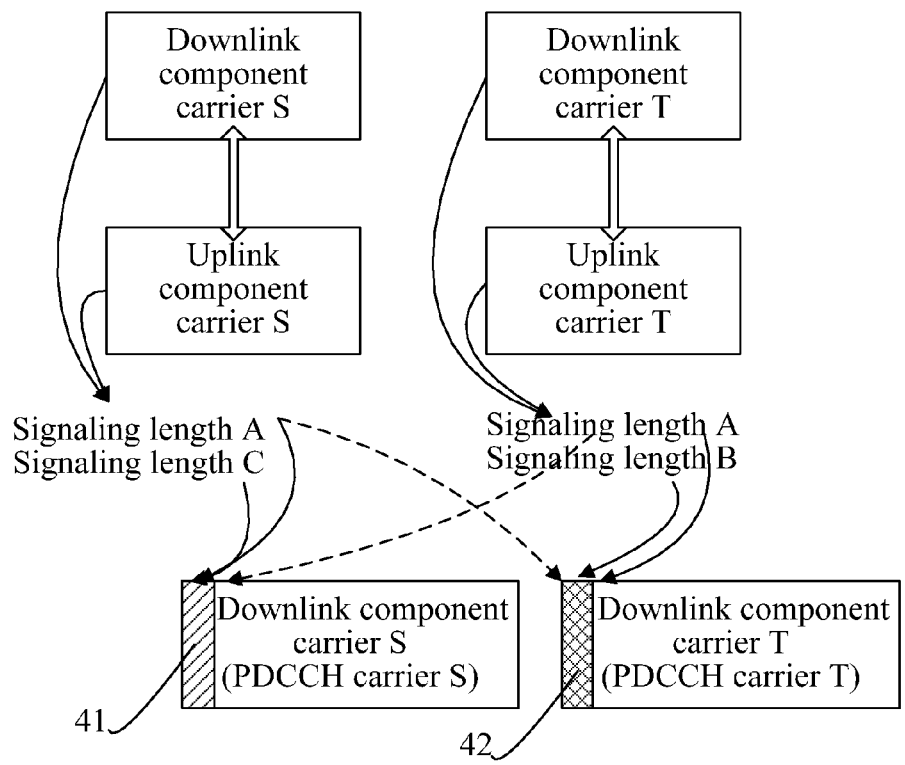
FIG. 4 is a schematic view of a method for determining a search space for a control channel in the method for mapping a control channel according to Embodiment 2 of the present disclosure.

In a second example, according to an initial search space corresponding to the control channel that has the signaling length, the search space corresponding to the control channel that has the signaling length is determined, and reference can be made to the related description in Embodiment 1 of the present disclosure for the specific cases and steps. For example, FIG. 4 is a schematic view of a method for determining a search space for a control channel in the method for mapping a control channel according to Embodiment 2 of the present disclosure. As shown in FIG. 4, a component carrier pair S includes a downlink component carrier S and a corresponding uplink component carrier S, the component carrier pair S corresponds to signaling lengths A and C, and an initial search space corresponding to control channels that have the two signaling lengths A and C corresponds to a region labeled 41 in the downlink component carrier S (the PDCCH carrier S); a component carrier pair T includes a downlink component carrier T and a corresponding uplink component carrier T, the uplink component carrier T corresponds to signaling lengths A and B, and an initial search space corresponding to control channels that have the two signaling lengths A and B corresponds to a region labeled 42 in the downlink component carrier T (the PDCCH carrier T). Both the signaling length C corresponding to the component carrier pair S and the signaling length B corresponding to the component carrier pair T are unique signaling lengths, so that the search spaces corresponding to the control channel that has the signaling length C and is corresponding to the component carrier pair S and the control channel that has the signaling length B and is corresponding to the component carrier pair T are completely or partially the same to respective corresponding initial search spaces, for example, the size of the search space corresponding to the control channel that has the signaling length C and is corresponding to the component carrier pair S is the initial search space 41 of S, and the size of the search space corresponding to the control channel that has the signaling length B and is corresponding to the component carrier pair T is the initial search space 42 of T. In addition, the signaling length A corresponding to the component carrier pair S and the signaling length A corresponding to the component carrier pair T are the same, the search spaces corresponding to the control channels that has the signaling length A and is corresponding to the component carrier pair S and the signaling length A corresponding to the component carrier pair T may be the same, and the size of the search space may be that: The search space corresponding to the control channel that has one signaling length A may be a part or all of the initial search spaces having the signaling length A corresponding to the component carrier pairs S and T. For example, if all of the initial search spaces are adopted, and represented as a universal set of initial search spaces corresponding to search spaces corresponding to control channels that have the signaling length A and are corresponding to the component carrier pair S and the signaling length A corresponding to the component carrier pair T, that is, the initial search space 41 and the initial search space 42. In addition, the control channel that has the signaling length A and is corresponding to the component carrier pair S being a part of the initial search space having the signaling length A corresponding to the component carrier pair T means that: Included CCEs can be increased or reduced according to the initial search space corresponding to a certain subset of the control channels that have the signaling length A. The method for determining the initial search space may have the following cases. In one case, an initial search space corresponding to each component carrier is determined, and the initial search space corresponding to the control channel that has each signaling length and is corresponding to the same component carrier is the initial search space of the same component carrier. At this time, a start position of the initial search space corresponding to each component carrier can be determined according to randomly one or more of: a UE ID, space division, a component carrier ID, a subframe number or an aggregation level. In another case, an initial search space corresponding to the control channel that has each signaling length and is corresponding to each component carrier is determined. If at least two same signaling lengths exist in signaling lengths corresponding to the same component carrier, the control channels that have the at least two same signaling lengths are enabled to use the same initial search space; and/or, if at least two different signaling lengths exist in the signaling lengths corresponding to the same component carrier, the control channels that have the at least two different signaling lengths are enabled to use different initial search spaces in at least one time transmission unit. At this time, according to a signaling length ID or a signaling length group ID, a start position of an initial search space corresponding to the control channel that has each signaling length and is corresponding to each component carrier is determined; or according to randomly one or more of: a signaling length ID or a signaling length group ID, and a UE ID, a control channel format ID, space division, a component carrier ID corresponding to the control channel, a subframe number or an aggregation level, a start position of an initial search space corresponding to the control channel that has each signaling length and is corresponding to each component carrier is determined. In still another case, after the component carriers are grouped, the initial search space corresponding to each component carrier group is determined, and the initial search space corresponding to the control channel that has each signaling length and is corresponding to the same component carrier group is the initial search space of the same component carrier group. At this time, according to randomly one or more of: a UE ID, space division, a component carrier group ID, a subframe number or an aggregation level, a start position of an initial search space corresponding to each component carrier group is determined. Reference can be made to the above formulas (1) to (6) and related description for the specific method of determining the start position of the initial search space, and the method can be implemented by merely modifying related parameters. In addition, reference can be made to the related description in Embodiment 1 of the present disclosure for the method for grouping the component carriers.

Furthermore, in this embodiment, for each aggregation level, the CCEs included in the search spaces corresponding to the control channels determined according to the signaling lengths of the control channels may be nonconsecutive or consecutive, and may be distributed on one carrier or distributed on multiple carriers. In the case of nonconsecutive CCEs, a nonconsecutive rule of the CCEs is acquired.

Furthermore, in this embodiment, for each aggregation level, position relationships between the determined control channels that have different signaling lengths may be nonconsecutive or consecutive, and may be completely not overlapped, partially overlapped or completely overlapped.

In this embodiment, when the corresponding search spaces of the control channels corresponding to the component carriers are determined, the position relationships between the search spaces can be determined according to the signaling lengths of the control channels, which includes the following examples.

In a first example, if the signaling lengths of the control channels corresponding to different component carriers are the same, it is determined that the search spaces corresponding to the component carriers having the same signaling length are completely overlapped or partially overlapped, and the control channel includes carrier indication information for indicating different component carriers.

When the search spaces are completely overlapped, the start positions of the search spaces corresponding to the component carriers having the same signaling length of the corresponding control channel are the same, and the sizes of the search spaces are also the same; while when the search spaces are partially overlapped, the search spaces corresponding to the component carriers having the same signaling length of the corresponding control channel at least include one same CCE. As the signaling lengths of the control channels corresponding to the component carriers having completely overlapped or partially overlapped search spaces are the same, the overlapping of search spaces can reduce the number of times of blind detection to a great extent. For example, when data transmission modes of a pair of uplink and downlink component carriers A and B are the same, the signaling lengths of corresponding PDCCHs for scheduling data transmission on each carrier pair are the same, and at this time, preferably the CCE numbers included in the two search spaces are completely the same; in this case, it can be regarded that only one search space exists, the PDCCHs corresponding to the two carriers may be borne at any position within the search space, thereby increasing the flexibility of placing the control channels, and the number of times of blind detection is not increased as the signaling lengths of the PDCCHs for scheduling multiple carriers are the same. At this time, each PDCCH requires carrier indication information that indicates which carrier is scheduled, and the carrier indication information may be implemented through a scrambling code of the carrier specific information or through a field display indication in the PDCCH. It is assumed that the search space corresponding to each aggregation level is M, and if one transmission mode corresponds to two signaling lengths of the PDCCH, in the search space M, the UE needs blind detection for 2M times. When the search spaces of the control channels that have the signaling length and are corresponding to different component carriers are completely overlapped or partially overlapped, the conflicts between the control channels can be reduced by increasing the sizes of the search spaces. For example, when the aggregation level is 8 CCEs and the search space in the existing solution is formed of 16 CCEs, in order to reduce the conflicts between the control channels, the size of the search space corresponding to the control channel that has the signaling length may be set greater than 16 CCEs, for example, set to 32 CCEs.

In a second example, if control channels corresponding to different component carriers have different signaling lengths, it is determined that the search spaces corresponding to the component carriers having the different signaling lengths are not overlapped.

For example, when the data transmission modes of the uplink and downlink component carrier pairs A and B are not the same, that is, the signaling lengths of the corresponding PDCCHs for scheduling data transmission on each component carrier pair may be different, each component carrier pair is configured according to the demands of its own transmission characteristics, and each component carrier pair has several different signaling lengths of the PDCCH. At this time, preferably, the CCE numbers included in the two search spaces are set completely different; in this case, it can be regarded that both the component carrier pairs A and B have respective independent search spaces corresponding to the control channels that have the carrier signaling lengths, and the PDCCHs corresponding to the two component carrier pairs can only be borne in corresponding search spaces for transmission respectively. Therefore, the PDCCH requires no information for indicating which component carrier pair is scheduled, and the information of the specific search space for the component carrier pair indicates which component carrier is scheduled, thereby saving the signaling overhead of the PDCCH. It is assumed that one search space corresponding to each aggregation level is M. If a transmission mode corresponds to two signaling lengths of the PDCCH, in the search space M, the UE needs blind detection for M times in each search space; while in the two search spaces, the UE needs blind detection for M+M=2M times in total. When the search spaces are not overlapped, the number of times of blind detection is not reduced; however, the size of the search space can be properly reduced or kept the same as that of the search space in the LTE system.

When for the same aggregation level, search spaces corresponding to control channels of different component carriers are not overlapped, carrier indication information of the component carrier, for example, identification information or a carrier index, may no longer be transmitted. The reason is that, for the same aggregation level, search spaces of different component carriers are not overlapped, so that when the UE detects a PDCCH in a specific search space, the UE learns that the PDCCH corresponds to the component carrier corresponding to the search space. When for the same aggregation level, the search spaces corresponding to the control channels of different component carriers are partially overlapped or completely overlapped, component carrier identification information needs to be transmitted, so that the UE learns which component carrier the PDCCH detected by the UE in the specific search space corresponds to.

In a third example, it is determined that the search spaces corresponding to the control channels that have the signaling lengths and are corresponding to the component carriers are partially overlapped.

The method in the first example may be adopted to make the search spaces corresponding to the control channels that have the signaling lengths and are corresponding to the component carriers only partially overlapped in some cases, and at this time collisions between the control channels are reduced, and the number of times of blind detection may also be decreased to a certain degree. In addition, in the third example, the search spaces corresponding to the control channels that have two same signaling lengths or different signaling lengths may be respectively determined, that is, the search spaces are independent and have no dependence relationships or rules. For example, the search spaces corresponding to the control channels that have two different signaling lengths may be respectively determined according to different signaling length IDs corresponding to the two different signaling lengths, or respectively determined according to component carrier IDs of the control channels that have the two different signaling lengths, or determined by any one or a combination of the foregoing correlative quantities; and/or, the search spaces corresponding to the control channels that have two different/same signaling lengths may also be respectively determined according to the different/same signaling length IDs corresponding to the two different/same signaling lengths, or respectively determined according to component carrier IDs of the control channels that have the two different/same signaling lengths, or determined by any one or a combination of the foregoing correlative quantities. In conclusion, the selection of specific ID parameters is not limited in the embodiments of the present disclosure. Thereby, the search spaces corresponding to the control channels that have the two same signaling lengths or different signaling lengths may be the same or different, that is, the search spaces corresponding to the control channels that have the signaling lengths and are corresponding to the component carriers may be partially overlapped, which depends on the randomization of the parameter for determining the search spaces acting on the method for determining the search spaces, or an independent determination method, and the present disclosure is not limited in this aspect.

Furthermore, the transmitting equipment may set a search space corresponding to control channels that have at least one specified signaling length and are corresponding to the UE as a search space to be preferentially detected, and set a search space corresponding to control channels that have other non-specified signaling lengths and are corresponding to the UE as a search space to be extensionally detected. As the component carrier bearing the control channels may be preferentially selected as the main carrier of the UE, the main carrier is the component carrier requiring continuous detection performed by the UE that is in a connected state, and the main carrier has relatively good channel conditions, so that the PDCCH corresponding to the UE has a good transmission performance, the signaling lengths of the PDCCHs corresponding to the main carrier may serve as specified signaling lengths, and the search space corresponding to the control channels that have the signaling lengths of the PDCCHs and are corresponding to the main carrier is set as a search space to be preferentially detected. In addition, the search space corresponding to the control channels that have the signaling lengths of the PDCCH that appear more times with a higher probability is set as a search space to be preferentially detected, and the search space corresponding to the control channels that have other signaling lengths of the PDCCH is set as a search space to be extensionally detected. The method for determining the search space to be preferentially detected and the search space to be extentionally detected, and the information such as signaling lengths and formats included in the search space to be preferentially detected and the search space to be extentionally detected are specified in the protocol, and may be explicitly obtained by the receiving and transmitting sides through algorithms in the standard protocol or notified to the receiving equipment by the transmitting side through dedicated signaling, including high layer semistatic signaling, physical layer dynamic signaling, and a media access layer control channel.

The transmitting equipment preferentially schedules the control channel that has the signaling length of the PDCCH and is corresponding to the main carrier, or preferentially schedules the control channel that has the signaling length of the PDCCH that appears more times with a higher probability, or preferentially schedules the control channel that has the signaling length of the PDCCH determined in other modes for data transmission. In addition, the search space to be preferentially detected and the search space to be extensionally detected may be or may not be overlapped, and if not overlapped, for an aggregation level, the search space corresponding to the control channels that have the signaling lengths of the PDCCH is formed of all the CCE numbers of the search space to be preferentially detected and the search space to be extensionally detected; while if overlapped, the search space corresponding to the control channels that have the signaling lengths of the PDCCH is formed of all the CCE numbers included in the search space to be preferentially detected or the search space to be extensionally detected.

In the LTE, for some UEs requiring monitoring of the control channels, blind detection needs to be performed on the public search space corresponding to at least one component carrier. Therefore, when the public search space has residual CCE resource for mapping and transmitting the only one PDCCH of the UE, the PDCCH of the UE can be borne in the public search space for transmission. At this time, when the public search space has no residual CCE resource for mapping and transmitting the PDCCH of the UE, only one or multiple PDCCHs that have the signaling lengths of the PDCCHs and are corresponding to the main carrier of the UE or the signaling lengths of the PDCCHs that appear more times with a higher probability are borne in the search space to be preferentially detected for transmission; and if other signaling lengths of the PDCCHs still exist, the PDCCHs having the other signaling lengths of the PDCCHs are borne in the search space to be extentionally detected for mapping and transmission.

In this embodiment, the transmitting equipment can allocate multiple search spaces on one or more downlink component carriers according to the signaling lengths of multiple control channels corresponding to PUSCHs scheduled by multiple uplink component carriers and/or PDSCHs scheduled by multiple downlink component carriers. In the allocated search space, the control channel that has each signaling length can be mapped, and for the transmitting equipment, the search space is the CCE region in which the transmitting equipment can map the PDCCH; while for the receiving equipment, the search space is the CCE region determined through blind detection of the control channels by the receiving equipment. The transmitting equipment may allocate independent search spaces to control channels that have each/multiple format(s) according to the types of the signaling lengths of the control channels that the UE may transmit in a period of time, the search spaces may be allocated on one or more component carriers, and the sizes of the search spaces may be configured according to the appearing number and/or probability of each signaling length corresponding to the UE, or may be changed according to the initial search space corresponding to each component carrier, so that the search space corresponding to the control channel that has each signaling length and the number of CCEs included in the search space corresponding to the PDCCH can be changed according to demands on one or more component carriers. For example, when the appearing number and/or probability of the PDCCHs having a certain signaling length is high, the number of CCEs included in the corresponding search space is increased, so that the number of control channels for transmission that can be accommodated is increased, and the probability of collisions during transmission of control channels with other UEs is reduced. On the contrary, when the appearing number and/or probability of the PDCCHs having a certain signaling length is low, the number of CCEs included in the corresponding search space is decreased, so that the resource for transmission of control channels is little, thereby reducing the number of times of blind detection performed by the UE on the control channels, decreasing the complexity of processing by the UE, and saving the power consumption of the battery.

In this embodiment, the component carrier may also be replaced by a component carrier pair, a component carrier group, a component carrier set or a component carrier pair set, the component carrier ID may be replaced by a component carrier pair ID, a component carrier group ID, a component carrier set ID or a component carrier pair set ID. Therefore, the description of the component carrier is also applicable to the component carrier pair, the component carrier group, the component carrier set or the component carrier pair set. For example, in the presence of multiple component carriers, in order to reduce the number of search spaces and the complexity of detection by the UE, the component carriers or component carrier pairs can be grouped, and each group is a component carrier set. At this time, the component carriers may be replaced by the component carrier sets.

Figure 5:
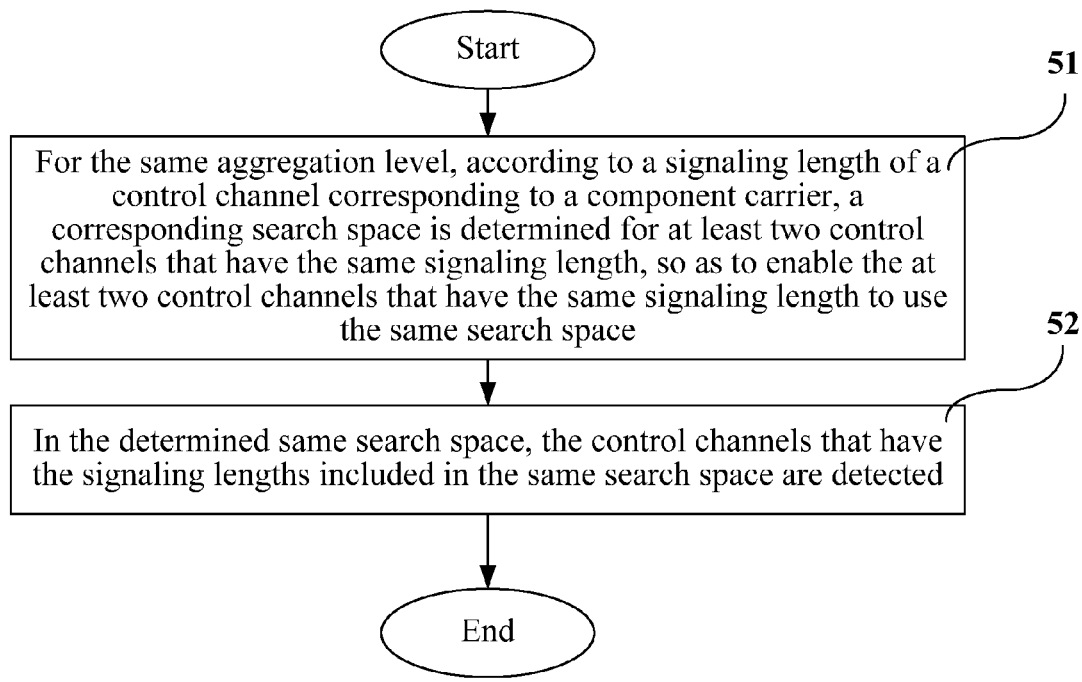
FIG. 5 is a flow chart of a method for detecting a control channel according to Embodiment 3 of the present disclosure.

FIG. 5 is a flow chart of a method for detecting a control channel according to Embodiment 3 of the present disclosure. As shown in FIG. 5, the method for detecting a control channel includes the following steps.

In step 51, for the same aggregation level, according to a signaling length of a control channel corresponding to a component carrier, a corresponding search space is determined for at least two control channels that have the same signaling length, so as to enable the at least two control channels that have the same signaling length to use the same search space.

In step 52, in the determined same search space, the control channels that have the signaling lengths included in the same search space are detected.

The enabling the at least two control channels that have the same signaling length to use the same search space includes: enabling the at least two control channels that have the same signaling length and are corresponding to different component carriers to use the same search space; or enabling the at least two control channels that have the same signaling length and are corresponding to the same component carrier to use the same search space.

Steps 51 and 52 provide the method in the case that the at least two control channels that have the same signaling length exist in one or more component carriers, and when at least two control channels that have different signaling lengths exist in one or more component carriers, steps 51 and 52 may also be the follows steps or performed together with the following steps.

For the same aggregation level, according to a signaling length of a control channel corresponding to a component carrier, corresponding search spaces are determined for at least two control channels that have different signaling lengths respectively, so as to enable the at least two control channels that have different signaling lengths to use the different search spaces in at least one time transmission unit; and in the determined different search spaces, the control channels that have the signaling lengths included in the different search spaces are detected.

The determining the corresponding search spaces for the at least two control channels that have different signaling lengths respectively, so as to enable the at least two control channels that have different signaling lengths to use the different search spaces in the at least one time transmission unit includes: determining corresponding search spaces respectively for at least two control channels that have different signaling lengths and are corresponding to different component carriers, so as to enable the at least two control channels that have different signaling lengths to use the different search spaces in at least one time transmission unit; or determining corresponding search spaces respectively for at least two control channels that have different signaling lengths and are corresponding to the same component carrier, so as to enable the at least two control channels that have different signaling lengths to use the different search spaces in at least one time transmission unit.

During the detecting, by the UE, of the control channels, the method for determining a search space corresponding to a control channel according to a signaling length of the control channel corresponding to a component carrier includes the following examples.

In a first example, the UE determines a start position and a size of the search space corresponding to the control channel. The method of determining by the UE the start position of the search space corresponding to the control channel is as follows. According to a signaling length ID or a signaling length group ID, the start position of the search space corresponding to the control channel is determined; or according to randomly one or more of: a signaling length ID or a signaling length group ID, and a UE ID, a control channel format ID, space division, a component carrier ID corresponding to the control channel, a subframe number or an aggregation level, the start position of the search space corresponding to the control channel is determined. For example, reference can be made to the related description of determination of the start position and size of the search space in Embodiments 1 and 2 of the present disclosure.

In a second example, the UE determines the search space corresponding to the control channel that has the signaling length according to an initial search space corresponding to the control channel that has the signaling length.

The method of determining by the UE the initial search space corresponding to the control channel that has the signaling length may include the following cases.

In one case, the initial search space corresponding to the control channel that has the signaling length is obtained through the following steps.

The initial search space corresponding to each component carrier is determined, and the initial search space corresponding to the control channel that has each signaling length and is corresponding to the same component carrier is the initial search space of the same component carrier.

At this time, according to randomly one or more of: a UE ID, space division, a component carrier ID, a subframe number or an aggregation level, the initial search space corresponding to each component carrier is determined.

In another case, the initial search space corresponding to the control channel that has the signaling length is obtained through the following steps.

In step 1, the initial search space corresponding to the control channel that has each signaling length and is corresponding to each component carrier is determined.

In step 2, if at least two same signaling lengths exist in the signaling lengths corresponding to the same component carrier, the control channels that have the at least two same signaling lengths are enabled to use the same initial search space; and/or if at least two different signaling lengths exist in the signaling lengths corresponding to the same component carrier, the control channels that have the at least two different signaling lengths are enabled to use different initial search spaces in at least one time transmission unit.

At this time, the start position of the initial search space corresponding to the control channel that has each signaling length and is corresponding to each component carrier can be determined according to a signaling length ID or a signaling length group ID; or the start position of the initial search space corresponding to the control channel that has each signaling length and is corresponding to each component carrier can be determined according to randomly one or more of: a signaling length ID or a signaling length group ID, and a UE ID, a control channel format ID, space division, a component carrier ID corresponding to the control channel, a subframe number or an aggregation level.

In yet another case, if the component carriers are grouped, the initial search space corresponding to the control channel that has the signaling length is obtained through the following steps.

The initial search space corresponding to each component carrier group is determined, in which the initial search space corresponding to the control channel that has each signaling length and is corresponding to the same component carrier group is the initial search space of the same component carrier group.

At this time, according to randomly one or more of: a UE ID, space division, a component carrier group ID, a subframe number or an aggregation level, the initial search space corresponding to each component carrier group is determined.

After the UE determines the initial search space corresponding to the control channel that has the signaling length, the method for determining the search space corresponding to the control channel that has the signaling length according to an initial search space corresponding to the control channel that has the signaling length is as follows.

If one signaling length of a control channel corresponding to one component carrier is different from one signaling length of a control channel corresponding to another one or more component carriers, the search space corresponding to the control channel that has one signaling length and is corresponding to the one component carrier and the another one or more component carriers is completely or partially the same as the initial search space corresponding to the control channel that has the one signaling length; and/or If one signaling length of a control channel corresponding to one component carrier is the same as one signaling length of a control channel corresponding to another one or more component carriers, the search space corresponding to the control channel that has one signaling length and is corresponding to the one component carrier and the another one or more component carriers is all or a part of a search space formed of the initial search space corresponding to the control channel that has the one signaling length and is corresponding to the one component carrier and the initial search space corresponding to the control channel that has the one signaling length and is corresponding to the another one or more component carriers. The search space corresponding to the control channel that has the one signaling length being a part of the search space formed by the initial search spaces corresponding to the control channels that have the signaling lengths means that: The search space corresponding to the control channel that has the one signaling length is a certain subset of all the initial search spaces corresponding to the control channels that have the signaling length, or the CCEs are increased or reduced according to the subset.

After determining the corresponding search space of the control channel according to the signaling length, the UE can perform, in the determined search space, blind detection on the control channels that have the signaling lengths included in the search space.

Furthermore, in the method for mapping a control channel, the control channel that has the specified signaling length is mapped to the search space to be preferentially detected, and the control channels that have non-specified signaling lengths are mapped to the search space to be extentionally detected. Correspondingly, if control channels that have specified signaling lengths exist in the search space to be preferentially detected, it is detected whether control channels that have non-specified signaling lengths exist in the search space to be extentionally detected; otherwise, it is not detected whether control channels that have non-specified signaling lengths exist in the search space to be extentionally detected.

For example, during blind detection of the control channels by the UE, in addition to the detection of the public search space, it may be first determined whether the signaling length corresponding to the UE exists in the search space to be preferentially detected. If the UE detects the control channel that has the signaling length of the UE itself in the search space to be preferentially detected, the UE continues detection in the search space to be extentionally detected, which stops only when blind detection is performed on all search spaces requiring detection. If the UE does not detect the control channel that has the signaling length of the UE itself in the search space to be preferentially detected, the UE no longer continues detection in the search space to be extentionally detected, and the detection stops directly.

In this embodiment, the control channel may be, for example, a PDCCH, but the present disclosure is not limited to the case that the control channel is a PDCCH. The description by taking the signaling length of the control channel as an example in this embodiment is also applicable to a format set or a signaling length set of the control channel.

In this embodiment, the UE may determine the start position and size of the search space according to the control channel that has the signaling length, and then perform detection in the determined search space. As the start position and size of the search space can be flexibly configured at the network side, the probability of collisions between the control channels is reduced. In addition, by differentiating the search space to be preferentially detected from the search space to be extentionally detected, the UE can be prevented from performing unnecessary blind detection in all the search spaces, thereby reducing the number of times of blind detection of the control channels by the UE, so as to further save the power consumption of the UE and avoid excessive blind detection errors.

Figure 6:
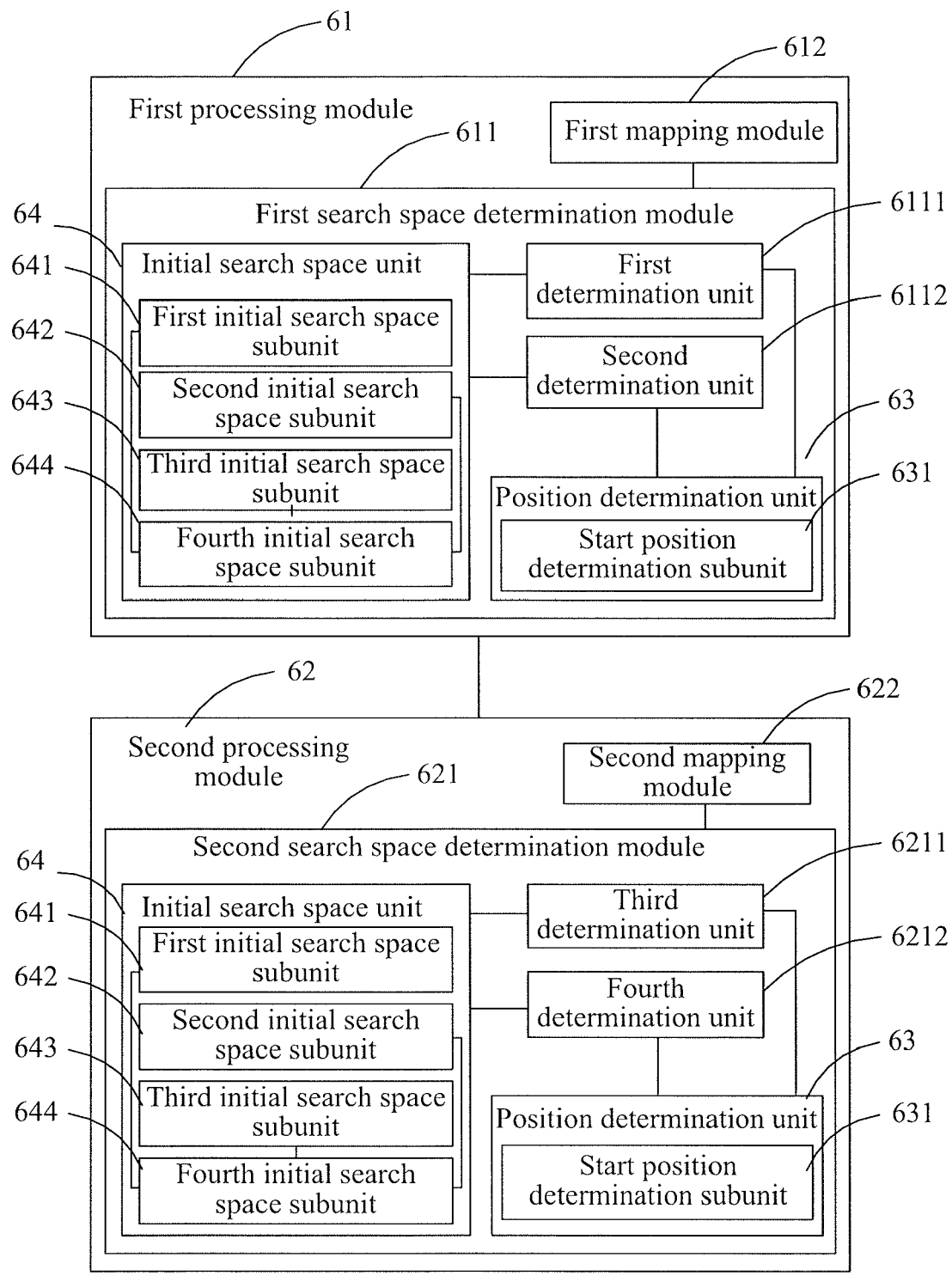
FIG. 6 is a schematic structural view of a transmitting equipment according to Embodiment 4 of the present disclosure.

FIG. 6 is a schematic structural view of a transmitting equipment according to Embodiment 4 of the present disclosure. As shown in FIG. 6, the transmitting equipment includes a first processing module 61 and a second processing module 62. The first processing module 61 includes a first search space determination module 611 and a first mapping module 612. The first search space determination module 611 is configured to, for the same aggregation level, according to a signaling length of a control channel corresponding to a component carrier, determine a corresponding search space for at least two control channels that have the same signaling length, so as to enable the at least two control channels that have the same signaling length to use the same search space. The first mapping module 612 is configured to map the at least two control channels that have the same signaling length to the corresponding search space determined by the first search space determination module 611.

The second processing module 62 includes a second search space determination module 621 and a second mapping module 622. The second search space determination module 621 is configured to, for the same aggregation level, according to a signaling length of a control channel corresponding to a component carrier, determine corresponding search spaces for at least two control channels that have different signaling lengths respectively, so as to enable the at least two control channels that have different signaling lengths to use the different search spaces in at least one time transmission unit. The second mapping module 622 is configured to respectively map the at least two control channels that have different signaling lengths to the corresponding search spaces determined by the second search space determination module 621.

Furthermore, the first search space determination module 611 may include a first determination unit 6111 or a second determination unit 6112.

The first determination unit 6111 is configured to, according to a signaling length of a control channel corresponding to a component carrier, determine a corresponding search space for at least two control channels that have the same signaling length, so as to enable the at least two control channels that have the same signaling length and are corresponding to different component carriers to use the same search space. The second determination unit 6112 is configured to, according to a signaling length of a control channel corresponding to a component carrier, determine a corresponding search space for at least two control channels that have the same signaling length, so as to enable the at least two control channels that have the same signaling length and are corresponding to the same component carrier to use the same search space.

The second search space determination module 621 includes a third determination unit 6211 or a fourth determination unit 6212.

The third determination unit 6211 is configured to respectively determine corresponding search spaces for at least two control channels that have different signaling length and are corresponding to different component carriers, so as to enable the at least two control channels that have different signaling lengths to use the different search spaces in at least one time transmission unit. The fourth determination unit 6212 is configured to respectively determine corresponding search spaces for at least two control channels that have different signaling length and are corresponding to the same component earlier, so as to enable the at least two control channels that have different signaling lengths to use the different search spaces in at least one time transmission unit.

Furthermore, the first search space determination module 611 and/or the second search space determination module 621 may further include a position determination unit 63 and/or an initial search space unit 64. The position determination unit 63 is configured to determine a start position and a size of the search space corresponding to the control channel. The initial search space unit 64 is configured to determine the search space corresponding to the control channel that has the signaling length according to an initial search space corresponding to the control channel that has the signaling length.

The position determination unit 63 includes a start position determination subunit 631.

The start position determination subunit 631 is configured to, according to a signaling length ID or a signaling length group ID, determine the start position of the search space corresponding to the control channel; or according to randomly one or more of: a signaling length ID or a signaling length group ID, and a UE ID, a control channel format ID, space division, a component carrier ID corresponding to the control channel, a subframe number or an aggregation level, determine the start position of the search space corresponding to the control channel. For example, reference can be made to the related description in Embodiments 1 and 2 of the present disclosure for the method.

The initial search space unit 64 includes a first initial search space subunit 641, a second initial search space subunit 642 or a third initial search space subunit 643, and further includes a fourth initial search space subunit 644.

The first initial search space subunit 641 is configured to determine the initial search space corresponding to each component carrier, in which the initial search space corresponding to the control channel that has each signaling length and is corresponding to the same component carrier is the initial search space of the same component carrier.

The second initial search space subunit 642 is configured to determine the initial search space corresponding to the control channel that has each signaling length and is corresponding to each component carrier, in which if at least two same signaling lengths exist in the signaling lengths corresponding to the same component carrier, the control channels that have the at least two same signaling lengths are enabled to use the same initial search space; and/or if at least two different signaling lengths exist in the signaling lengths corresponding to the same component carrier, the control channels that have the at least two different signaling lengths are enabled to use different initial search spaces in at least one time transmission unit.

The third initial search space subunit 643 is configured to determine the initial search space corresponding to each component carrier group after the component carriers are grouped, in which the initial search space corresponding to the control channel that has each signaling length and is corresponding to the same component carrier group is the initial search space of the same component carrier group.

The fourth initial search space subunit 644 is configured to, if one signaling length of a control channel corresponding to one component carrier is different from one signaling length of a control channel corresponding to another one or more component carriers, make that the search space corresponding to the control channel that has one signaling length and is corresponding to the one component carrier and the another one or more component carriers is completely or partially the same as the initial search space corresponding to the control channel that has the one signaling length; and/or if one signaling length of a control channel corresponding to one component carrier is the same as one signaling length of a control channel corresponding to another one or more component carriers, make that the search space corresponding to the control channel that has one signaling length and is corresponding to the one component carrier and the another one or more component carriers is all or a part of a search space formed of the initial search space corresponding to the control channel that has the one signaling length and is corresponding to the one component carrier and the initial search space corresponding to the control channel that has the one signaling length and is corresponding to the another one or more component carriers.

For example, the method of determining the search space by the initial search space unit 64 according to the initial search space corresponding to the control channel that has the signaling length may include the following cases.

In a first case, the first initial search space subunit 641 determines the initial search space corresponding to each component carrier, in which the initial search space corresponding to the control channel that has each signaling length and is corresponding to the same component carrier is the initial search space of the same component carrier.

At this time, the start position of the initial search space corresponding to each component carrier may be determined according to randomly one or more of: a UE ID, space division, a component carrier ID, a subframe number or an aggregation level.

In a second case, the second initial search space subunit 642 determines the initial search space corresponding to the control channel that has each signaling length and is corresponding to each component carrier, in which if at least two same signaling lengths exist in the signaling lengths corresponding to the same component carrier, the control channels that have the at least two same signaling lengths are enabled to use the same initial search space; and/or if at least two different signaling lengths exist in the signaling lengths corresponding to the same component carrier, the control channels that have the at least two different signaling lengths are enabled to use the different initial search spaces in at least one time transmission unit.

At this time, the start position of the initial search space corresponding to the control channel that has each signaling length and is corresponding to each component carrier may be determined according to a signaling length ID or a signaling length group ID; or the start position of the initial search space corresponding to the control channel that has each signaling length and is corresponding to each component carrier is determined according to randomly one or more of: a signaling length ID or a signaling length group ID, and a UE ID, a control channel format ID, space division, a component carrier ID corresponding to the control channel, a subframe number or an aggregation level.

In a third case, the third initial search space subunit 643 determines the initial search space corresponding to each component carrier group, in which the initial search space corresponding to the control channel that has each signaling length and is corresponding to the same component carrier group is the initial search space of the same component carrier group. In the third case, the transmitting equipment may further include a grouping unit, configured to group the component carriers. The grouping method includes, but is not limited to, dividing each pair of uplink and downlink component carriers into a group; or dividing component carriers having the same transmission mode into a group; or dividing the component carriers having the same transmission bandwidth into a group; or dividing the component carriers having the same number of transmission antennas into a group.

At this time, the start position of the initial search space corresponding to each component carrier group may be determined according to randomly one or more of: a UE ID, space division, a component carrier group ID, a subframe number or an aggregation level.

In this embodiment, reference can be made to the related description in Embodiments 1 and 2 of the present disclosure for the specific method of determining the initial search space corresponding to the control channel that has the signaling length by the initial search space unit.

After the initial search space unit 64 determines the initial search space corresponding to the control channel that has the signaling length, the determining, by the fourth initial search space subunit 644, the search space corresponding to the control channel that has the signaling length according to the initial search space corresponding to the control channel that has the signaling length includes the following step.

If one signaling length of a control channel corresponding to one component carrier is different from one signaling length of a control channel corresponding to another one or more component carriers, the search space corresponding to the control channels that have one signaling length and are corresponding to the one component carrier and the another one or more component carriers is completely or partially the same as the initial search space corresponding to the control channel that has the one signaling length.

Alternatively, if one signaling length of a control channel corresponding to one component carrier is the same as one signaling length of a control channel corresponding to another one or more component carriers, the search space corresponding to the control channel that has one signaling length and is corresponding to the one component carrier and the another one or more component carriers is all or a part of a search space formed of the initial search space corresponding to the control channel that has the one signaling length and is corresponding to the one component carrier and the initial search space corresponding to the control channel that has the one signaling length and is corresponding to the another one or more component carriers. For example, reference can be made to the related description in Embodiments 1 and 2 of the present disclosure.

Furthermore, the first search space determination module 611 and/or the second search space determination module 621 are further configured to set the search space corresponding to the control channel that has the determined signaling length as a search space to be preferentially detected, and set the search space corresponding to the control channel that has the non-determined signaling length as a search space to be extensionally detected.

For the same aggregation level, the transmitting equipment provided in this embodiment may set different search spaces according to signaling lengths of the control channels, thereby reducing conflicts between the control channels. Also, the transmitting equipment may further make the search spaces corresponding to the control channels that have the same signaling length overlapped or partially overlapped, thereby reducing the number of times of blind detection by the UE; or make the search spaces corresponding to the control channels that have different signaling lengths not overlapped, so as to implicitly notify the signaling length corresponding to the search space to the UE, thereby saving the signaling overhead. The transmitting equipment may further map the determined search space corresponding to the control channel that has the signaling length to the search space to be preferentially detected, so as to enable the UE to preferentially detect the control channels in the determined search space corresponding to the control channel that has the signaling length, thereby reducing the number of times of blind detection.

Figure 7:
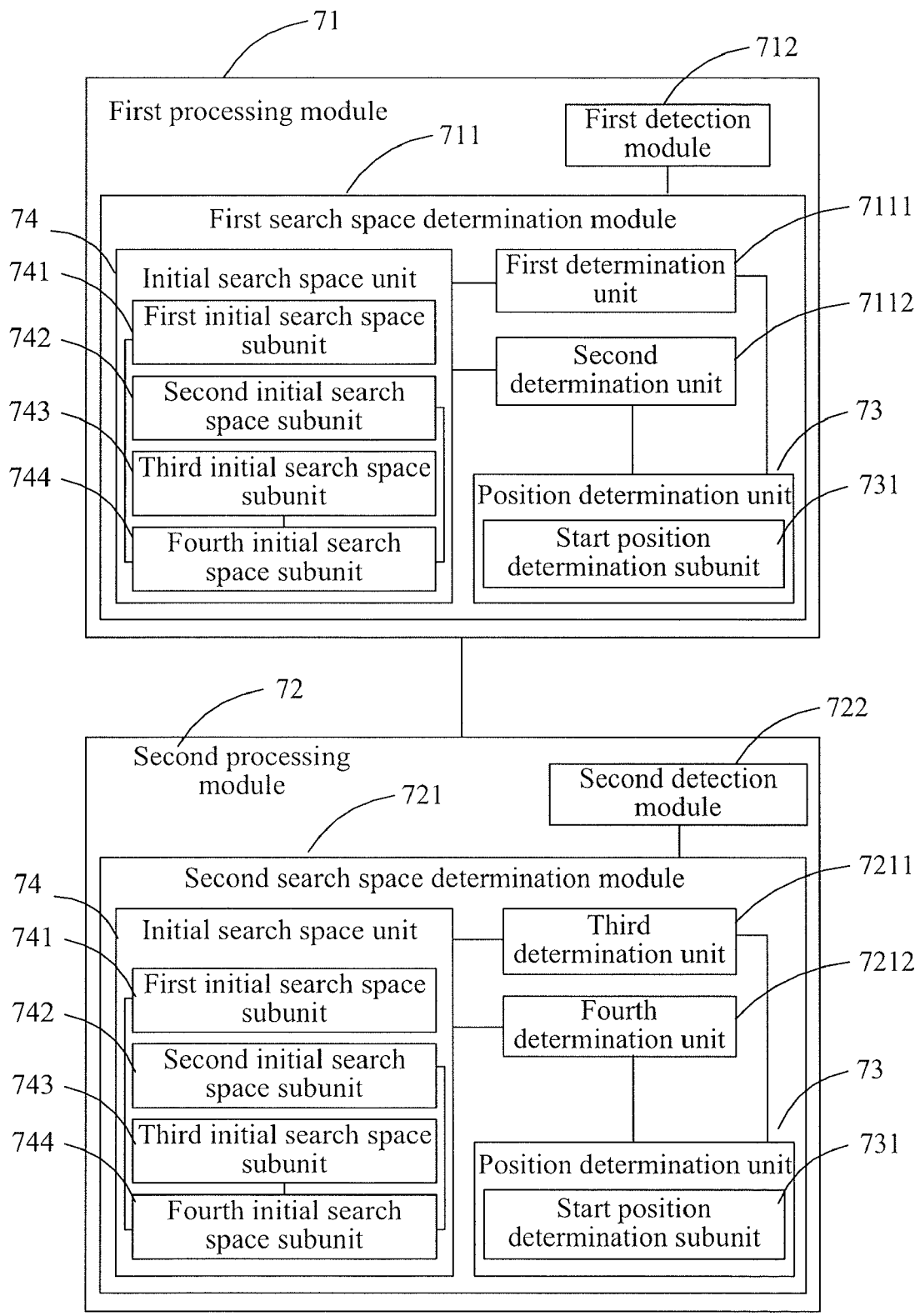
FIG. 7 is a schematic structural view of a receiving equipment according to Embodiment 5 of the present disclosure.

FIG. 7 is a schematic structural view of a receiving equipment according to Embodiment 5 of the present disclosure. As shown in FIG. 7, the receiving equipment includes a first processing module 71 and/or a second processing module 72. The first processing module 71 includes a first search space determination module 711 and a first detection module 712. The first search space determination module 711 is configured to, for the same aggregation level, according to a signaling length of a control channel corresponding to a component carrier, determine a corresponding search space for at least two control channels that have the same signaling length, so as to enable the at least two control channels that have the same signaling length to use the same search space. The first detection module 712 is configured to, in the same search space determined by the first search space determination module 711, detect the control channels that have the signaling lengths included in the same search space.

The second processing module 72 includes a second search space determination module 721 and a second detection module 722. The second search space determination module 721 is configured to, for the same aggregation level, according to a signaling length of a control channel corresponding to a component carrier, determine corresponding search spaces for at least two control channels that have different signaling lengths respectively, so as to enable the at least two control channels that have different signaling lengths to use the different search spaces in at least one time transmission unit. The second detection module 722 is configured to respectively detect, in the different search spaces determined by the second search space determination module 721, the control channels that have the signaling lengths included in the different search spaces.

Furthermore, the first search space determination module 711 may further include a first determination unit 7111 or a second determination unit 7112.

The first determination unit 7111 is configured to, according to a signaling length of a control channel corresponding to a component carrier, determine a corresponding search space for at least two control channels that have the same signaling length, so as to enable the at least two control channels that have the same signaling length and are corresponding to different component carriers to use the same search space. The second determination unit 7112 is configured to, according to a signaling length of a control channel corresponding to a component carrier, determine a corresponding search space for at least two control channels that have the same signaling length, so as to enable the at least two control channels that have the same signaling length and are corresponding to the same component carrier to use the same search space.

The second search space determination module 721 includes a third determination unit 7211 or a fourth determination unit 7212.

The third determination unit 7211 is configured to respectively determine corresponding search spaces for control channels that have at least two different signaling length and are corresponding to different component carriers, so as to enable the at least two control channels that have different signaling lengths to use the different search spaces in at least one time transmission unit. The fourth determination unit 7212 is configured to respectively determine corresponding search spaces for at least two control channels that have different signaling length and are corresponding to the same component carrier, so as to enable the at least two control channels that have different signaling lengths to use the different search spaces in at least one time transmission unit.

The first search space determination module 711 and/or the second search space determination module 721 may further include a position determination unit 73 and/or an initial search space unit 74.

The position determination unit 73 is configured to determine a start position and a size of the search space corresponding to the control channel. The initial search space unit 74 is configured to determine the search space corresponding to the control channel that has the signaling length according to an initial search space corresponding to the control channel that has the signaling length. For example, reference can be made to the related description in Embodiments 1 and 2 of the present disclosure.

Furthermore, the position determination unit 73 includes a start position determination subunit 731.

The start position determination subunit 731 is configured to, according to a signaling length ID or a signaling length group ID, determine the start position of the search space corresponding to the control channel; or according to randomly one or more of: a signaling length ID or a signaling length group ID, and a UE ID, a control channel format ID, space division, a component carrier ID corresponding to the control channel, a subframe number or an aggregation level, determine the start position of the search space corresponding to the control channel.

The initial search space unit 74 includes a first initial search space subunit 741, a second initial search space subunit 742 or a third initial search space subunit 743, and further includes a fourth initial search space subunit 744.

The first initial search space subunit 741 is configured to determine the initial search space corresponding to each component carrier, in which the initial search space corresponding to the control channel that has each signaling length and is corresponding to the same component carrier is the initial search space of the same component carrier.

The second initial search space subunit 742 is configured to determine the initial search space corresponding to the control channel that has each signaling length and is corresponding to each component carrier, in which if at least two same signaling lengths exist in the signaling lengths corresponding to the same component carrier, the control channels that have the at least two same signaling lengths are enabled to use the same initial search space; and/or if at least two different signaling lengths exist in the signaling lengths corresponding to the same component carrier, the control channels that have the at least two different signaling lengths are enabled to use the different initial search spaces in at least one time transmission unit.

The third initial search space subunit 743 is configured to determine the initial search space corresponding to each component carrier group after the component carriers are grouped, in which the initial search space corresponding to the control channel that has each signaling length and is corresponding to the same component carrier group is the initial search space of the same component carrier group.

The fourth initial search space subunit 744 is configured to, if one signaling length of a control channel corresponding to one component carrier is different from one signaling length of a control channel corresponding to another one or more component carriers, make that the search space corresponding to the control channel that has one signaling length and is corresponding to the one component carrier and the another one or more component carriers is completely or partially the same as the initial search space corresponding to the control channel that has the one signaling length; and/or if one signaling length of a control channel corresponding to one component carrier is the same as one signaling length of a control channel corresponding to another one or more component carriers, make that the search space corresponding to the control channel that has one signaling length and is corresponding to the one component carrier and the another one or more component carriers is all or a part of a search space formed of the initial search space corresponding to the control channel that has the one signaling length and is corresponding to the one component carrier and the initial search space corresponding to the control channel that has the one signaling length and is corresponding to the another one or more component carriers.

Furthermore, after the first search space determination module 711 determines the search space corresponding to the control channel according to the signaling length, the first detection module 712 is further configured to perform blind detection, in the determined same search space, on the control channels that have signaling lengths included in the same search space. After the second search space determination module determines the search space corresponding to the control channel according to the signaling length, the second detection module is further configured to perform blind detection, in the determined different search spaces, on the control channels that have the signaling lengths included in the different search spaces.

In addition, when the search space includes the search space to be preferentially detected, if the control channel that has the determined signaling length exists in the search space to be preferentially detected, the first detection module 712 and/or the second detection module 722 detect whether the control channel that has the non-determined signaling length exists in the search space to be extensionally detected. If the control channel that has the determined signaling length does not exist in the search space to be preferentially detected, the first detection module 712 and/or the second detection module 722 do not detect whether the control channel that has the non-determined signaling length exists in the search space to be extensionally detected.

In this embodiment, the receiving equipment may be a UE. In this embodiment, reference can be made to the related description in Embodiment 1 of the present disclosure for the specific method of determining, by the receiving equipment, the search space according to the signaling length of the control channel for the same aggregation level and detecting the control channel in the search space.

For the same aggregation level, the receiving equipment provided in this embodiment may determine the search space according to the signaling length of the control channel, so as to detect the control channel that has the signaling length in the search space. Moreover, as the search spaces corresponding to the component carriers having the same signaling length of the corresponding control channels may be overlapped or partially overlapped, the number of times of blind detection by the UE is reduced. In addition, the UE preferentially detects the search space corresponding to the control channel that has the determined signaling length, so as to further reduce the number of times of blind detection.

It should be noted that persons of ordinary skill in the art should understand that all or a part of the processes of the method according to the embodiments of the present disclosure may be implemented by a program instructing relevant hardware. The program may be stored in a computer readable storage medium. When the program is run, the processes of the method according to the embodiments of the present disclosure are performed. The storage medium may be a magnetic disk, an optical disk, a read-only memory (ROM), or a random access memory (RAM).

In addition, the functional units in the embodiments of the present disclosure may either be integrated in a processing module, or exist as separate physical units; alternatively, two or more units may be integrated in one module. The integrated modules may be implemented in the form of hardware or software functional modules. If implemented in the form of software functional modules and sold or used as an independent product, the integrated modules may also be stored in a computer readable storage medium. The storage medium may be a ROM, a magnetic disk, or an optical disk.

The specific embodiments are not intended to limit the scope of the present disclosure. Any modifications, equivalent replacements, and improvements made by persons of ordinary skill in the art shall fall within the scope of the present disclosure. Therefore, the protection scope of the present disclosure is subject to the appended claims.

What is claimed is:

1. A method for mapping a control channel, comprising:
determining, by a network equipment, for the same aggregation level, at least two control channels having an identical signaling length and at least two control channels having different signaling lengths;
determining, by the network equipment, a first search space corresponding to the at least two control channels having the identical signaling length;
determining, by the network equipment, in at least one time transmission unit for the same aggregation level, a second search space corresponding to the at least two control channels having signaling lengths different from that of the control channels having the identical signaling length; and
mapping, by the network equipment, the at least two control channels having the identical signaling length to the first search space, and the at least two control channels having different signaling lengths to the second search space.

2. The method according to claim 1, wherein the at least two control channels having the identical signaling length correspond to different component carriers.

3. The method according to claim 1, wherein determining the first search space comprises:
determining the first search space according to initial search spaces of the at least two control channels having identical signaling length.

4. The method according to claim 1, wherein the determining the second search space comprises:
determining an initial search space of the at least two control channels having different signaling lengths.

5. The method according to claim 3, wherein the first search space is at least a portion of initial search spaces of the at least two control channels having the identical signaling length.

6. A method for detecting a control channel, comprising:
receiving, by user equipment, search space having control channels that have identical signal length and search space having control channels that have different signaling lengths;
determining, by the user equipment, for the same aggregation level, at least two control channels having an identical signaling length and at least two control channels having different signaling lengths;
determining, by the user equipment, a first search space corresponding to the at least two control channels having the identical search length; and
determining, by the user equipment, in at least one time transmission unit for the same aggregation level, a second search space corresponding to the at least two control channels having signaling lengths different from that of the control channels having the identical signaling length; and
detecting, by the user equipment, the at least two control channels in the first search space, and the at least two control channels in the second search space.

7. The method according to claim 6, wherein the at least two control channels having the identical signaling length correspond to different component carriers.

8. The method according to claim 6, wherein determining the first search space comprises:
determining initial search spaces of the at least two control channels having identical signaling length.

9. The method according to claim 6, wherein the determining the second search spaces comprises:
determining an initial search space of the at least two control channels having different signaling lengths.

10. The method according to claim 8, wherein the first search space is at least a portion of search space formed of initial search spaces of the at least two control channels that have the same signaling length.

11. A network equipment, comprising:
a processing unit, configured to determine, for the same aggregation level, a first search space for at least two control channels having the same signaling length, the processing unit being operable to determine for at least one time transmission unit for the same aggregation level, a second search space for at least two control channels having different signaling lengths;
a mapping unit, configured to map the at least two control channels having the same signaling length to the first search space, and to map the at least two other control channels having different signaling lengths to the second search space.

12. The network equipment according to claim 11, wherein the at least two control channels having the same signaling length correspond to different component carriers.

13. The network equipment according to claim 11, wherein determining the first search space comprises:
determining initial search spaces of the at least two control channels having the same signaling length.

14. The network equipment according to claim 11, wherein determination of the second search space comprises:
determining an initial search space for each of the at least two control channels having a signaling length different from that of the at least two control channels having identical signaling length.

15. The network equipment according to claim 13, wherein the first search space is at least a portion of initial search spaces of the at least two control channels having the same signaling length.

16. A user equipment, comprising:
- a receiving unit, configure to receive search space having control channels that have identical signal length and search space having control channels that have different signaling lengths;
- a processing unit, configured to determine, for the same aggregation level, a first search space for at least two control channels having the same signaling length,
- the processing unit being operable to determine for at least one time transmission unit for the same aggregation level, a second search space for at least two control channels having different signaling lengths;
- a detecting unit, configured to detect the at least two control channels in the first search space, and the at least two control channels in the second search space.

17. The user equipment according to claim 16, wherein the at least two control channels having the identical signaling length correspond to different component carriers.

18. The user equipment according to claim 16, wherein determining the first search space comprises:
- determining initial search spaces of the at least two control channels having identical signaling length.

19. The user equipment according to claim 16, wherein determination of the second search space comprises:
- determining an initial search space for each of the at least two control channels having a signaling length different from that of the at least two control channels having identical signaling length.

20. The user equipment according to claim 18, wherein the first search space is at least a portion of initial search spaces of the at least two control channels having identical signaling length.

* * * * *